United States Patent [19]

Sato et al.

[11] Patent Number: 4,971,445
[45] Date of Patent: Nov. 20, 1990

[54] FINE SURFACE PROFILE MEASURING APPARATUS

[75] Inventors: Eiichi Sato, Tokyo; Kiyozo Koshiishi; Sadao Shigetomi, both of Sagamihara; Syunpei Tanaka, Tokyo; Makoto Yoshinaga, Tokyo; Terumasa Morita, Tokyo; Chikara Nagano, Tokyo; Shohei Kobayashi, Tokyo; Chiaki Sato, Tokyo; Akitoshi Toda, Tokyo; Mitunori Kubo; Ikuo Tofukuji, Tokyo, all of Japan

[73] Assignee: Olympus Optical Co., Ltd., Tokyo, Japan

[21] Appl. No.: 191,606

[22] Filed: May 9, 1988

[30] Foreign Application Priority Data

| May 12, 1987 | [JP] | Japan | 62-115343 |
| May 12, 1987 | [JP] | Japan | 62-115346 |
| Aug. 27, 1987 | [JP] | Japan | 62-213562 |
| Mar. 18, 1988 | [JP] | Japan | 63-66515 |

[51] Int. Cl.$^5$ .......................... G01B 11/24
[52] U.S. Cl. ..................... 356/376; 250/572
[58] Field of Search ............ 356/237, 375, 376; 250/572; 358/106, 107

[56] References Cited

U.S. PATENT DOCUMENTS

4,615,621 10/1986 Allen et al.
4,689,491 8/1987 Lindow et al. ............ 250/572
4,726,685 2/1988 Kobayashi et al.
4,732,485 3/1988 Morita et al.

FOREIGN PATENT DOCUMENTS

0055025 6/1982 European Pat. Off.
0094835 11/1983 European Pat. Off.
58-176505 10/1983 Japan.
59-27207 2/1984 Japan.
59-90007 5/1984 Japan.
60-38606 2/1985 Japan.
61-240103 10/1986 Japan.
62-36502 2/1987 Japan.

OTHER PUBLICATIONS

"Thick Film Hybrid Inspection with a Computer-Controlled High Resolution Imaging and Storage System", SPIE, vol. 220, Arlan et al., 1980, pp. 130-139.

Primary Examiner—Davis L. Willis
Assistant Examiner—S. A. Turner
Attorney, Agent, or Firm—Frishauf, Holtz, Goodman & Woodward

[57] ABSTRACT

A fine surface profile meter includes an X-Y stage, supported by a leaf spring, for supporting a sample thereon, a piezoelectric actuator for two-dimensionally scanning the X-Y stage, a positioning table, disposed below the X-Y stage, for positioning the X-Y stage at an arbitrary position, an objective lens disposed above the X-Y stage, an observation optical system for allowing an operator to observe an enlarged sample image, a measurement optical system, an optical axis of which is aligned with an optical path of the objective lens through a beam splitter, the measurement optical system for emitting a laser beam onto the sample through the objective lens and to receive the laser beam reflected by the sample, a calculator circuit for calculating height information of the sample using an output from the measurement optical system and for obtaining a two-dimensional distribution of the height information, a cover for shielding the X-Y stage, the positioning means, the objective lens, the beam splitter, the observation optical system, and the measurement optical system from an outer atmosphere, a detachable measurement unit for integrally holding the objective lens, the beam splitter, and the measurement optical system, a supporting plate supported on the X-Y stage through columns, and an arm, mounted on the supporting plate, for supporting the measurement optical system and the observation optical system.

12 Claims, 19 Drawing Sheets

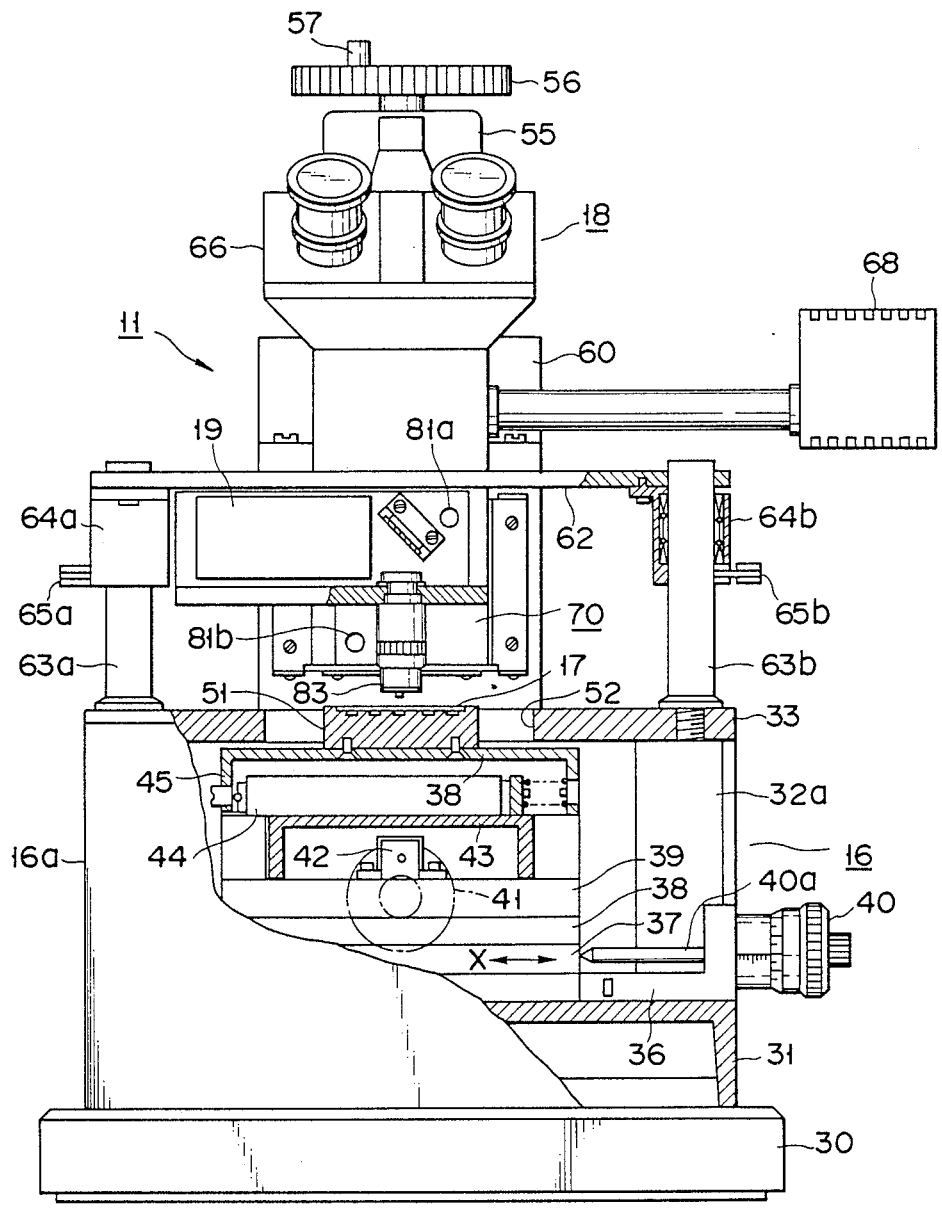
F I G. 3

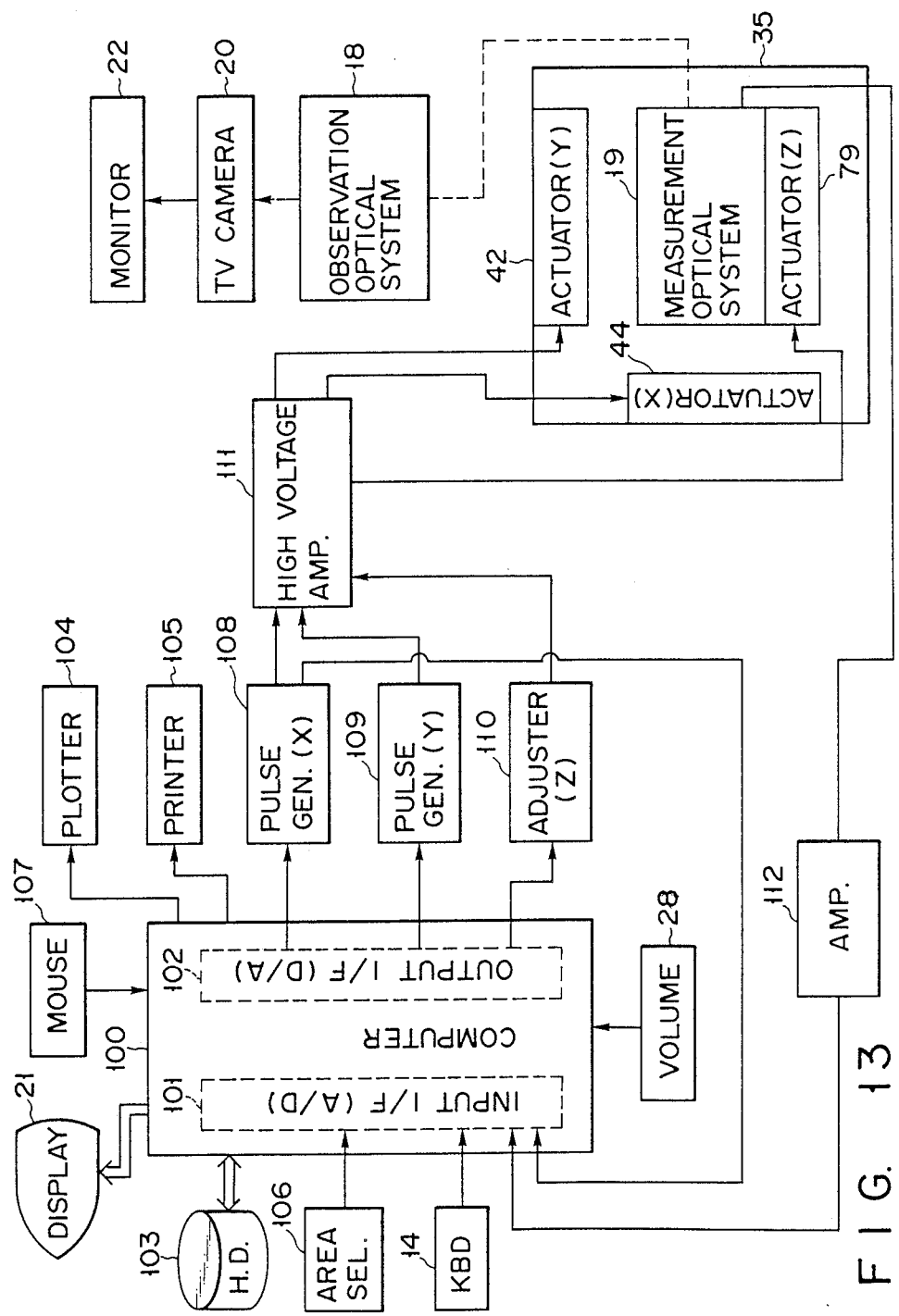
F I G. 13

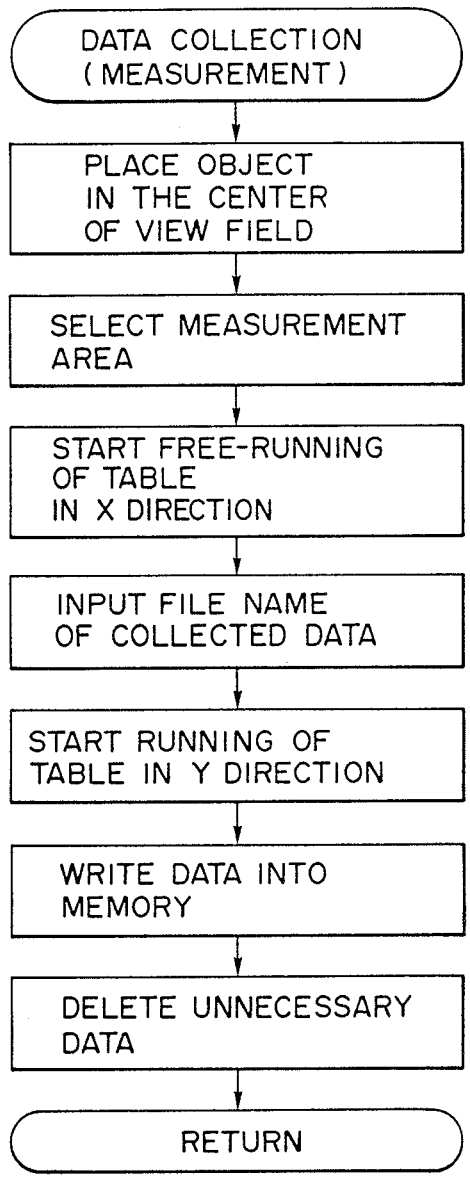
F I G. 14

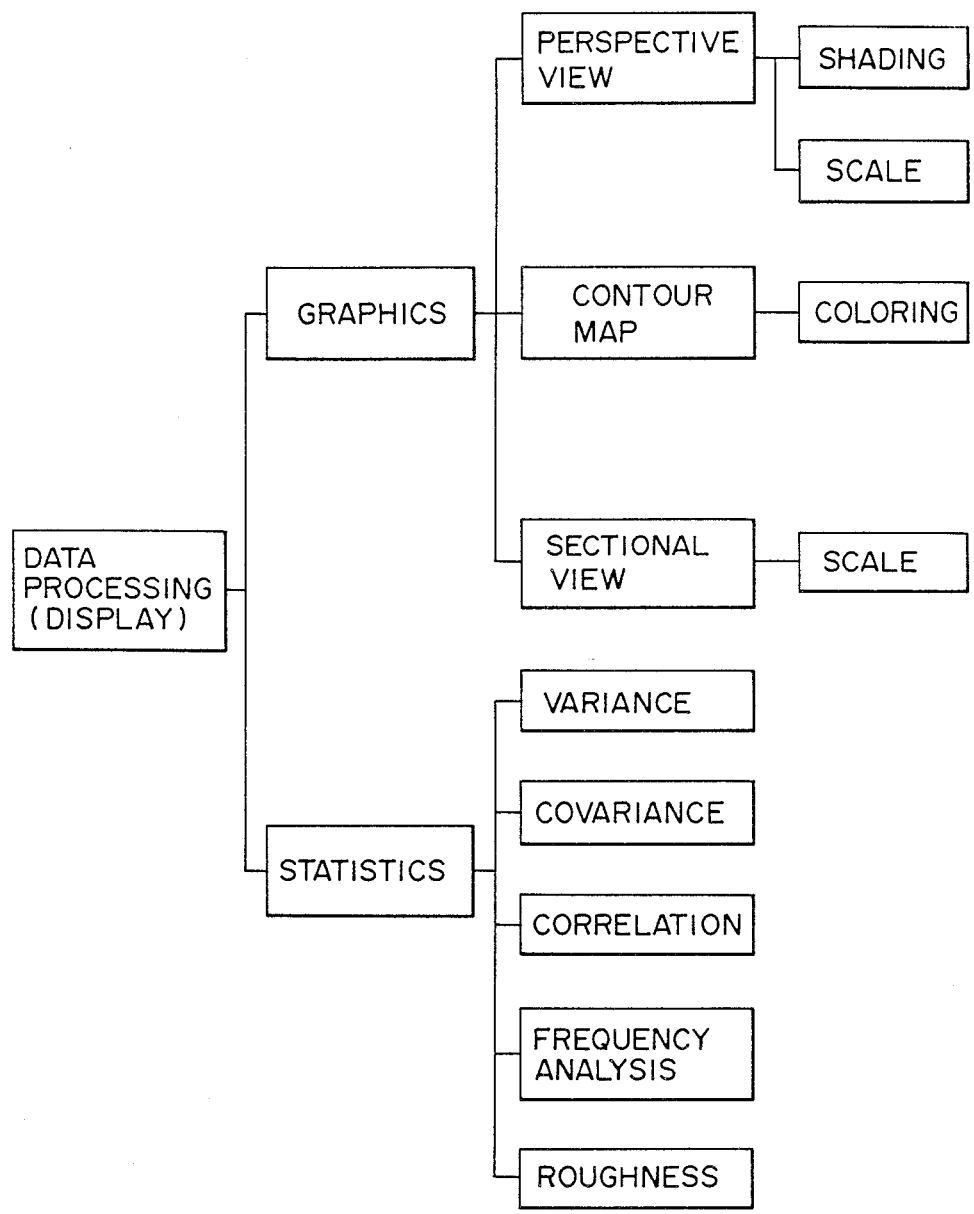
F I G. 15

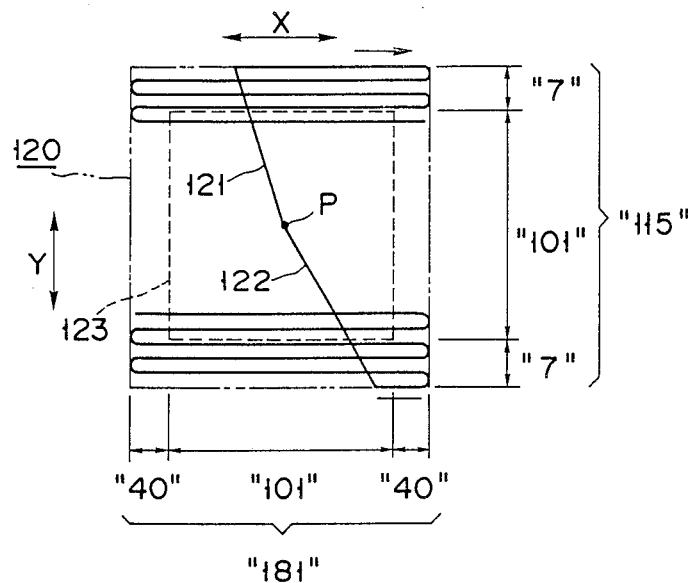
F I G. 17
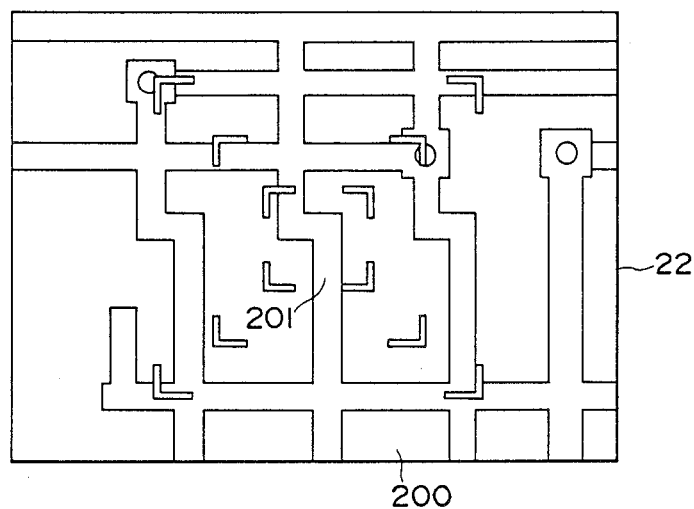
F I G. 18

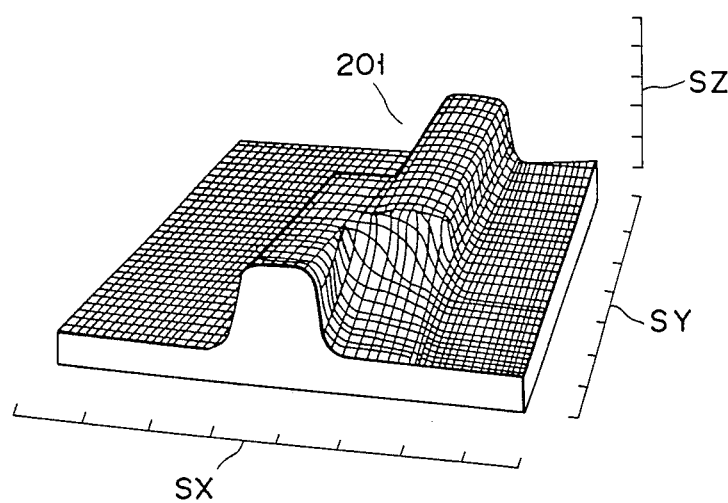
F I G. 19
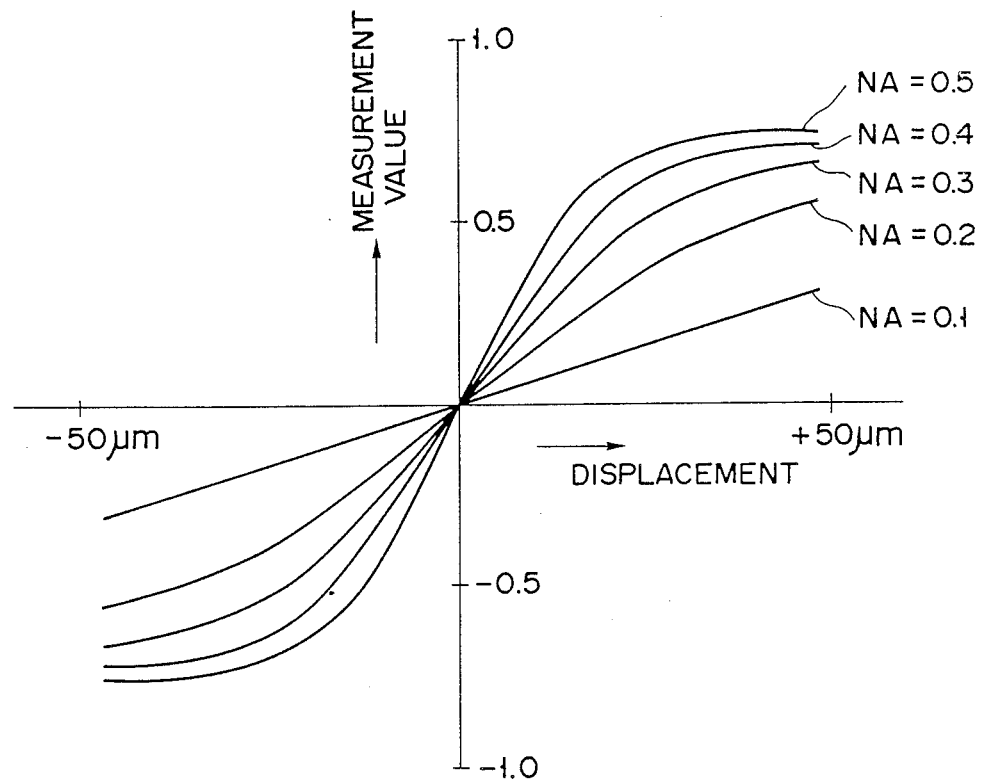
F I G. 20

FINE SURFACE PROFILE MEASURING APPARATUS

BACKGROUND OF THE INVENTION

1. Field of the Invention

The present invention relates to a fine surface profile measuring apparatus for measuring surface roughness of, e.g., various metal products or mirrors or a surface pattern of, e.g., a semiconductor chip or optical disk on an order of nanometers with high accuracy using an optical method.

2. Description of the Related Art

Conventional optical size measuring apparatuses using a critical angle prism are described in Japanese Patent Disclosure (Kokai) Nos. 59-90007, 60-38606, 61-240103, and 58-176505. These apparatuses are examples of a measuring apparatus using a critical angle prism in accordance with a focusing error method. That is, a reflection amount of the critical angle prism varies in accordance with whether a sample is located in front of or behind a focal point of an objective lens. Therefore, the above apparatuses detect the reflection amount and measure the height of the sample.

Japanese Patent Disclosure (Kokai) No. 59-27207 describes a non-contact surface profile/roughness meter for measuring a displacement in accordance with a vertical movement designation signal of an objective lens in a focusing apparatus by vertically moving an objective lens in accordance with a focusing error detection signal.

Although any of the above apparatuses measures a fine area of the sample, there is no optical system for observing the surface of the sample. Therefore, a point of a sample to be measured is not accurately determined. Especially when a sample has a fine structure as an IC wafer, although a measurement point must be positioned on a micron order, this operation cannot be performed. In addition, since an error is produced in a measurement value when dust or a scratch is present on a measurement point, the state of a surface must be checked.

An example of a conventional apparatus which eliminates the above drawbacks is a microdisplacement measuring microscope described in Japanese Patent Disclosure (Kokai) No. 62-36502. This apparatus has a microscope for observing the surface of a sample in an enlarged scale. In this apparatus, a single objective lens is commonly used as an objective lens for the microscope and that for a displacement measurement optical system.

In this apparatus, however, since the objective lens is commonly used for the two optical systems, complexity of optical axis adjustment is amplified when the objective lens is to be exchanged in accordance with resolution of displacement measurement or a measurable displacement range. In this case, although measurement of the apparatus is performed in nanometers, no countermeasure for vibration is made. Therefore, the measurement is susceptible to a vibration of a flat or the vibration of an air. When an observer moves closer to an eyepiece to use the microscope, the optical systems slightly vary by an air flow caused by breathing of the operator, thereby varying a measurement value.

Furthermore, a sample is scanned generally by a pulse motor. However, scanning is temporarily stopped at each measurement point because the pulse motor is step-driven. In addition, measurement is started after vibration caused by an impact upon stopping is sufficiently suppressed, resulting in time-consuming measurement.

SUMMARY OF THE INVENTION

It is an object of the present invention to provide a microdisplacement measuring apparatus capable of accurately measuring microdisplacements without being adversely affected by vibration or the like.

It is another object of the present invention to provide a fine surface shape measuring apparatus capable of measuring a two-dimensional distribution of the height within a short period of time.

It is still another object of the present invention to provide a microdisplacement measuring apparatus in which optical adjustment can be easily performed when an objective lens is exchanged.

It is further object of the present invention to provide a fine surface profile measuring apparatus capable of automatic focusing of the objective lens of a measuring optical system.

According to an aspect of this invention, there is provided a fine surface profile measuring apparatus comprising table means for supporting a sample thereon, a measurement optical system for emitting a measurement light onto the sample placed on said table means and for receiving the measurement light reflected by the sample, drive means for two-dimensionally moving said table means, operating means for calculating height information of the sample on the basis of a signal output from said measurement optical system and for obtaining a two-dimensional distribution of the height information of the sample, and cover means for covering at least said measurement optical means.

According to another aspect of this invention, there is provided a micro-displacement measuring apparatus comprising table means, mounted on a base, for supporting a sample thereon and two-dimensionally moving the sample, a measurement optical system for emitting a measurement light onto the sample on said table means and for receiving the measurement light reflected by the sample, an observation optical system for forming an optical image of the sample in an enlarged manner, a supporting plate, supported at a vicinity of a table surface of said table means through supporting member standing on said base, and having an opening corresponding to said table means, and arm means, mounted on said supporting plate, for supporting said measurement optical system and said observation optical system.

According to further aspect of this invention, there is provided a micro-displacement measuring apparatus comprising table means for supporting a sample thereon, an objective lens disposed above said table means, a measurement optical system for emitting a measurement light onto the sample on said table means through said objective lens and for receiving the measurement light reflected by the sample, an observation optical system for forming an optical image of the sample through said objective lens in an enlarged manner, coarse focus adjusting means for moving said measurement optical system, said observation optical system, and said objective lens together in a height direction, means for locking said coarse focus adjusting means to fix a distance between said observation optical system and the sample, fine focus adjusting means for moving said objective lens and said measurement optical system in the height direction, and signal processing means for calculating height information of the sample on the basis of a signal output from said measurement optical system.

According to still another aspect of this invention, there is provided a fine surface profile measuring apparatus comprising table means for supporting a sample thereon, drive means for micro-displacing said table means in accordance with a control signal, positioning means for supporting said table means and said drive means and for placing said table means and said drive means in an arbitrary point in a plane in which said table means is micro-displaced, a measurement optical system for emitting a measurement light onto the sample on said table means and for receiving the measurement light reflected by the sample, and signal processing means for supplying the control signal to said drive means, for calculating height information of the sample on the basis of an output from said measurement optical system, and for obtaining a two-dimensional distribution of the height information of the sample.

According to still further aspect of this invention, there is provided a fine surface profile measuring apparatus comprising table means for supporting a sample thereon, a measurement optical system for emitting a measurement light onto the sample on said table means and for receiving the measurement light reflected by the sample, means for generating a saw-toothed wave signal of which a peak is rounded, actuator means for two-dimensionally vibrating said table means in accordance with an amplitude of the saw-toothed wave and scanning with the measurement light a range larger than a measurement range of the sample, and signal processing means for calculating height information of the sample on the basis of a signal associated with the measurement range of the sample and selected from outputs from said measurement optical system and for obtaining a two-dimensional distribution of the height information of the sample.

According to still another aspect of this invention, there is provided a micro-displacement measuring apparatus comprising table means for supporting a sample thereon, an objective lens disposed above said table means, a measurement optical system for emitting a measurement light onto the sample on said table means through said objective lens and for receiving the measurement light reflected by the sample, an observation optical system for forming an optical image of the sample through said objective lens in an enlarged manner, beam mixing means for aligning an optical path of said measurement optical system with that of said observation optical system and for transmitting a beam through said objective lens, said beam mixing means being integrally formed as a detachable unit with said measurement optical system and said objective lens, and signal processing means, connected to said measurement optical system, for measuring height information of the sample on the basis of the measurement light reflected by the sample and transmitted through said objective lens.

According to still further aspect of this invention, there is provided a micro-displacement measuring apparatus comprising table means for supporting a sample thereon, an objective lens disposed above said table means, a measurement optical system for emitting a measurement light onto the sample on said table means through said objective lens and for receiving the measurement light reflected by the sample, an observation optical system for forming an optical image of the sample in an enlarged manner, beam mixing means for aligning an optical path of said observation optical system with that of said measurement optical system and for transmitting the measurement light through said objective lens, signal processing means, connected to said measurement optical system, for measuring height information of the sample on the basis of the measurement light reflected by the sample and transmitted through said objective lens, and means for two-dimensionally scanning said table means in a plane perpendicular to the measurement light and for causing the measurement light to two-dimensionally scan a measurement area of the sample on said table means, the center of a view field of said observation optical system being aligned with a center of the measurement area.

According to still another aspect of this invention, there is provided a micro-displacement measuring apparatus comprising table means for supporting a sample thereon, an objective lens disposed above said table means, an observation optical system for forming an optical image of the sample through said objective lens in an enlarged manner, a measurement optical system using a focus error method for emitting a measurement light onto the sample on said table means through said objective lens and for receiving the measurement light reflected by the sample, signal processing means for calculating height information of the sample using an output from said measurement optical system, and focus adjusting means for moving said objective lens in a height direction in response to an output from said operating means and for adjusting a focal point of said measurement optical system.

BRIEF DESCRIPTION OF THE DRAWINGS

FIG. 3 is a front view of the measuring apparatus of the first embodiment;

FIG. 13 is a block diagram of a controller;

FIG. 14 is a flow chart for explaining a data collection (measurement) operation;

FIG. 15 is a view for explaining a data processing (display) operation;

FIG. 17 is a view for explaining scanning of a sample with a laser beam;

FIG. 18 is a view of wiring of a semiconductor element as a sample;

FIG. 19 is a perspective view of FIG. 18;

FIG. 20 is a graph of a characteristic change in displacement sensor according to a numerical aperture of an objective lens;

DETAILED DESCRIPTION OF THE PREFERRED EMBODIMENTS

Figure 1:
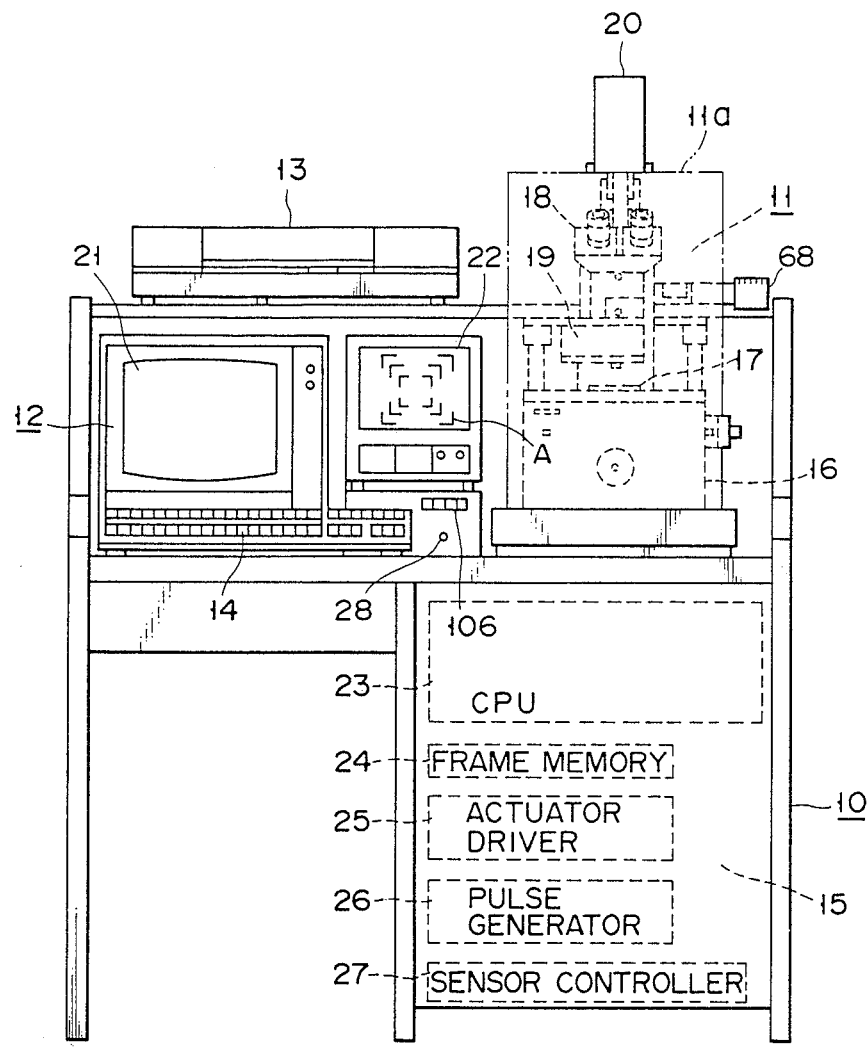
FIG. 1 is a front view of an entire system including a fine surface profile measuring apparatus according to the first embodiment of the present invention.
Figure 2:
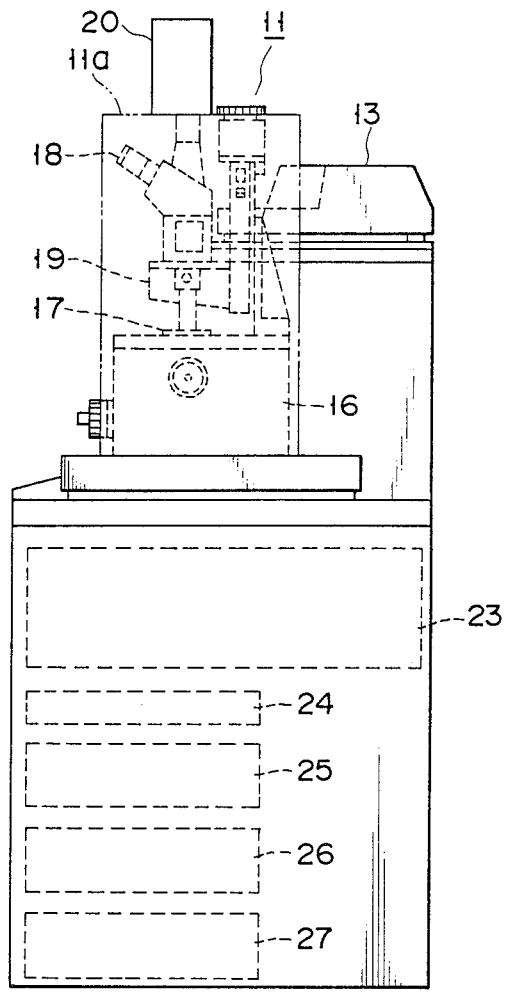
FIG. 2 is a side view of the entire system of the first embodiment.

FIGS. 1 and 2 are front and side views, respectively, of an outer appearance of the first embodiment of the present invention. In FIGS. 1 and 2, measuring apparatus 11, display 12, recorder 13, and keyboard 14 are arranged on desk 10. Apparatus 11 is entirely surrounded by box-like cover 11a. Therefore, apparatus 11 does not vibrate by breathing of an operator, thereby preventing an error in measurement value. Controller 15 is incorporated in desk 10. Although these units will be described in detail later, they are briefly described below.

Apparatus 11 comprises X-Y scanning mechanism 16 for horizontally X-Y scanning an object to be measured (to be referred to as a sample hereinafter) 17 placed on its upper surface, observation optical system 18 mainly constituted by a conventional microscope for enlarging and observing a fine surface of sample 17 placed on a sample table of mechanism 16 as a two-dimensional image, and height (displacement) measurement optical system 19 which commonly uses an objective lens of observation optical system 18. Observation optical system 18 is connected to TV camera 20. Camera 20 is provided to observe the two-dimensional image because cover 11a covers an eyepiece of optical system 18. However, the eyepiece can be placed outside cover 11a. Note that light source 68 for optical system 18 is provided independently of cover 11a. Therefore, apparatus 11 does not vibrate by an air flow caused by heat of the lamp.

Display 12 includes graphic display 21 for three-dimensionally displaying an image of a fine surface profile of sample 17 obtained by processing height information obtained by height measurement optical system 19, video monitor 22 for displaying a two-dimensional image of the surface of sample 17 obtained by TV camera, and the like. L-shaped indices A for indicating four corners of a measurement display range of optical system 19 are provided in monitor 22 and a view field of the eyepiece of observation optical system 18.

Recorder 13 includes a plotter, a printer, and the like and records display contents of display 21, monitor 22 or the like together with a sample name, a measurement date, an ambient temperature, and the like.

Keyboard 14 has a known arrangement including function keys, numerical keys, and the like and capable of inputting control data or the like of the apparatus.

Controller 15 includes CPU 23, frame memory 24, actuator driver 25, pulse generator 26, sensor controller 27, and the like. Controller 15 controls driving of X-Y scanning mechanism 16 or performs processing of obtaining a three-dimensional image (perspective view) of a fine surface profile of sample 17 in accordance with the height information obtained by height measurement optical system 19. Note that as shown in FIG. 1, volume control 28 for controlling a piezoelectric actuator of a fine adjustment driver (to be described later) is provided on an operation panel. Each unit will be described in detail below.

Figure 4:
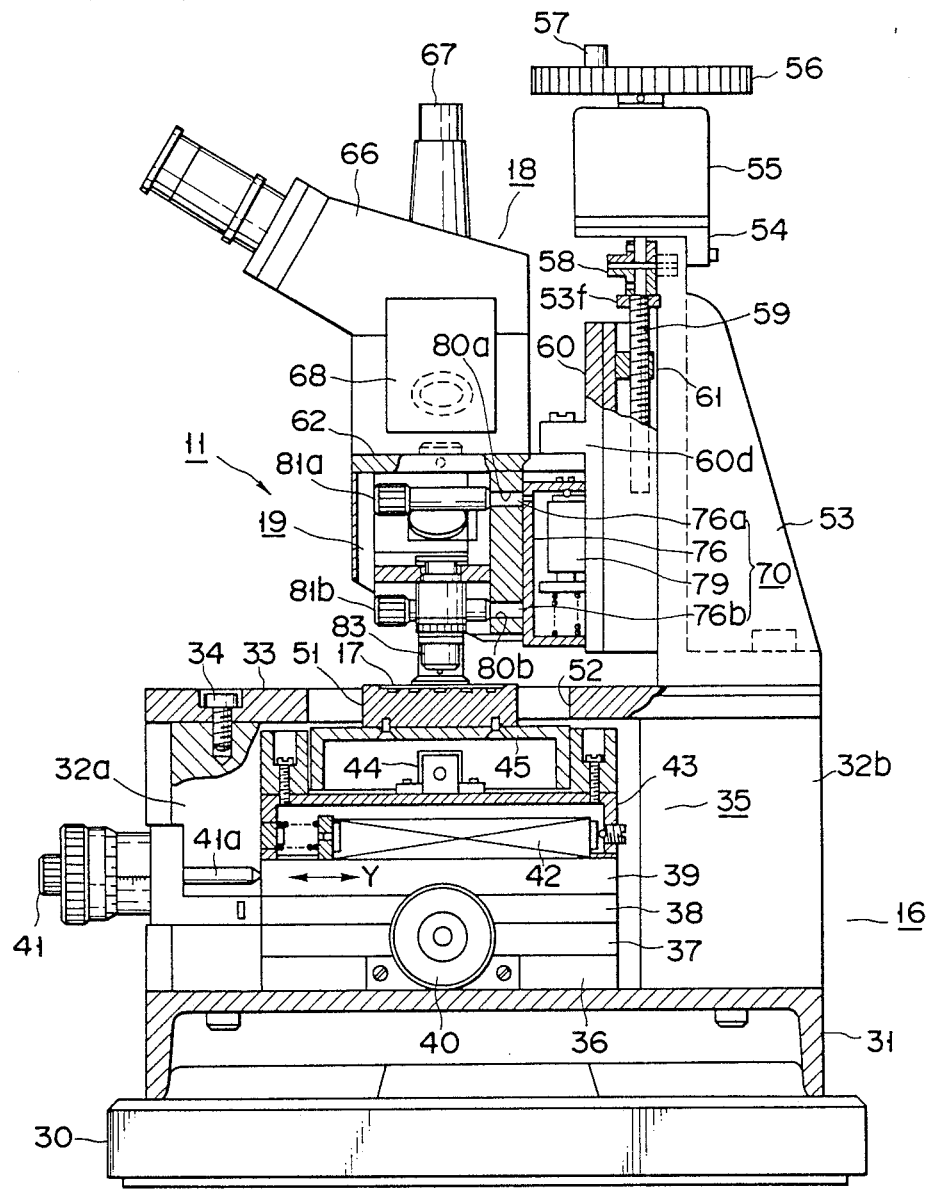
FIG. 4 is a side view of the measuring apparatus.

FIGS. 3 and 4 are partially cutaway front and side views, respectively, showing measuring apparatus 11 in detail. In FIGS. 3 and 4, vibration-proof base 30 adopts a vibration-proof structure using an air spring whose pressure is controlled. X-Y scanning mechanism 16 is placed on base 30. In mechanism 16, posts 32a and 32b stand upright at corner portions of rectangular base 31 fixed on vibration-proof base 30, supporting plate 33 is fixed at the tops of posts 32a and 32b by bolt 34, and X-Y stage 35 is housed in a space surrounded by base 31, posts 32a and 32b, and supporting plate 33. Mechanism 16 is also surrounded by box-like cover 16a to obtain a vibration-proof structure.

X-Y stage 35 has the following arrangement. That is, X-side base 36 is fixed on base 31, X-axis positioning slide plate 37 is provided on X-side base 36 to be slidable in a direction of arrow X in FIG. 3. Y-side base 38 is fixed on slide plate 37, and Y-axis positioning slide plate 39 is provided on Y-side base 38 to be slidable in a direction of arrow Y in FIG. 4. Slide plate 37 is slid by operation rod 40a which is moved forward/backward by a screw feed mechanism (not shown) by rotating X-axis operation dial 40. Slide plate 39 is slid by operation rod 41a which is moved forward/backward by a screw feed mechanism (not shown) by rotating Y-axis operation dial 41. The screw feed mechanism is provided such that slide plates 37 and 39 are moved forward/backward by about 2 μm by rotating dials 40 and 41 by one step, respectively. A reference position (initial position) of stage 35 can be arbitrarily changed by slide plates 37 and 39. That is, after a sample is placed on stage 35, the sample can be positioned by moving stage 35.

Laminated piezoelectric actuator 42 for Y scanning is provided on slide plate 39 so that Y table 43 on slide plate 39 is reciprocated in a Y direction by a driving force of piezoelectric actuator 42. Laminated piezoelectric actuator 44 for X scanning is provided on Y table 43 so that X table 45 on Y table 43 is reciprocated in an X direction by a driving force of actuator 44. That is, stage 35 is constituted by actuators 42 and 44 and tables 43 and 45.

Figure 5:
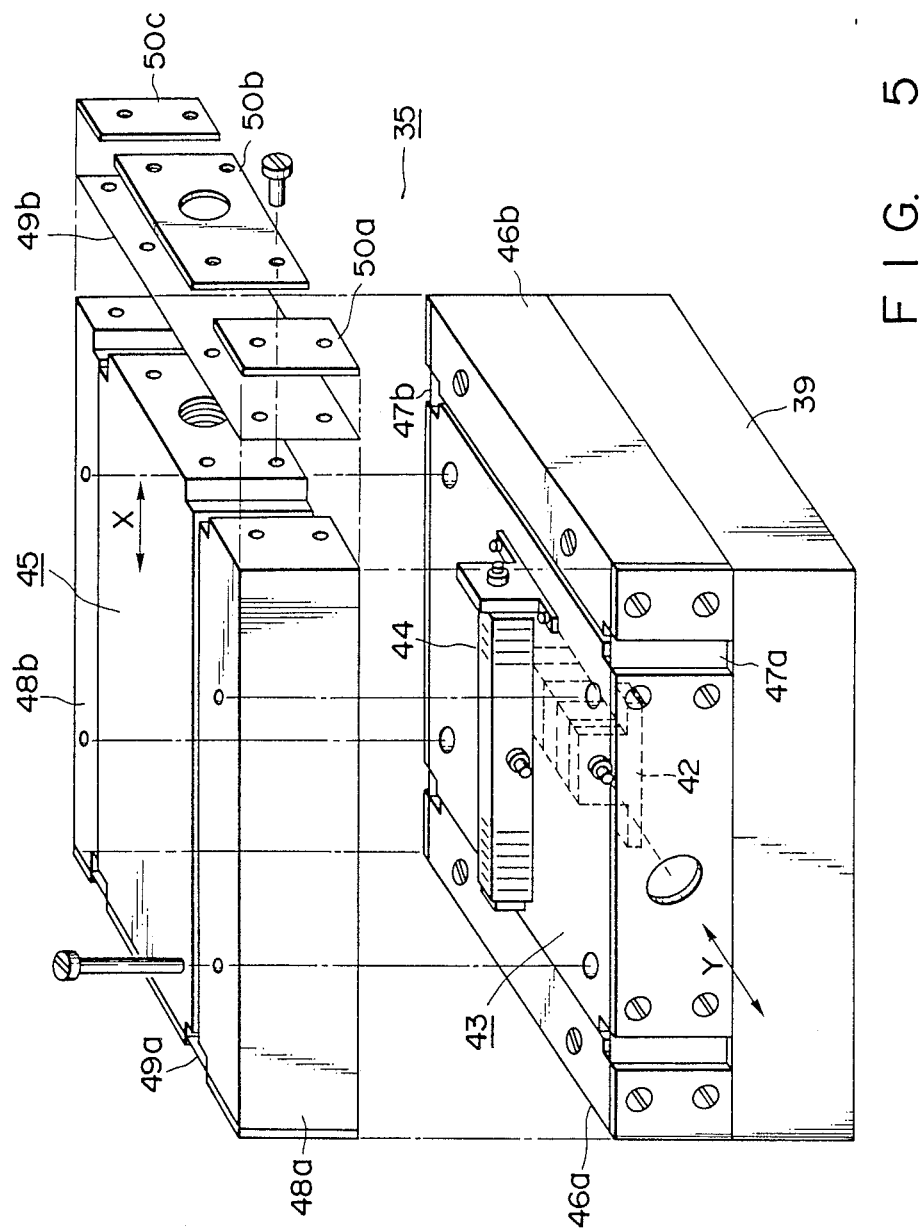
FIG. 5 is an exploded perspective view of a main part of an X-Y stage.

FIG. 5 is an exploded perspective view of an arrangement of a main part of X-Y stage 35. As shown in FIG. 5, a pair of guide blocks 46a and 46b are parallelly arranged in the Y direction and fixed by screws along side edges on slide plate 39. Rectangular parallel leaf springs 47a and 47b are fixed by screws at both ends of blocks 46a and 46b. Y table 43 is sandwiched at its both ends between springs 47a and 47b. Table 43 is coupled to the displacement end portion of piezoelectric actuator 42 fixed at its proximal end portion on slide plate 39 and displaced in the Y direction.

A pair of guide blocks 48a and 48b are parallelly arranged in the X direction and fixed by screws along side edges on table 43. Rectangular parallel leaf springs 49a and 49b are fixed by screws at both ends of blocks 48a and 48b. X table 45 is sandwiched at its both ends between springs 49a and 49b. Table 45 is coupled to the displacement end portion of piezoelectric actuator 44 fixed at its proximal end portion on table 43 and is displaced in the X direction. Therefore, since actuators 44 and 42 are disposed in tables 45 and 43, respectively, stage 35 can serve as a fine scanning stage having a very compact size. In addition, since vibration is smaller than that produced in scanning performed by a pulse motor, an error is rarely produced in the measurement data. Therefore, a surface profile can be measured within a short period of time without stopping scanning at each measurement point.

Although only spring 49b is exemplified at the upper right portion of FIG. 5, each of springs 47a, 47b, 49a, and 49b is fixed by screws through fixing members 50a, 50b, and 50c provided on its outer surface.

Referring back to FIGS. 3 and 4, sample table 51 is fixed by screws at the upper surface central portion of X table 45. The upper surface of table 51 on which sample 17 is placed projects outward from window 52 formed in the central portion of supporting plate 33. Note that although the sample is not fixed but merely placed, scanning performed by a piezoelectric actuator is very smooth, and therefore no problem is posed.

Column 53 having substantially a triangular shape as a whole is fixed at a rear end position (right end position in FIG. 4) of plate 33 at a position above the top of post 32b. Motor holding plate 54 is horizontally mounted at the top of column 53. Motor 55 is fixed on plate 54 so that its rotational shaft is vertically positioned. Manual rotation operation plate 56 is coupled to an upper projecting portion of the rotational shaft of motor 55. Operation pin 57 for coarse adjustment (fast feeding) extends from a peripheral portion of plate 56. By rotating pin 57, the rotational shaft of the motor can be manually rotated through operation plate 56. An upper end portion of feeding threaded shaft 59 is coupled to a lower projecting portion of the rotational shaft of motor 55 through frictional plate joint 58. Shaft 59 is vertically and rotatably held by holding piece 53f of column 53. Feeding nut 61 of optical system holder 60 is threadably engaged with a feeding threaded portion of shaft 59. Thus, according to this embodiment, column 53 for holding the optical systems is not directly fixed to base 31 but is fixed on plate 33 supported by base 31 through posts 32. Therefore, the height of column 53 can be reduced to improve the vibration-proof property.

Figure 6:
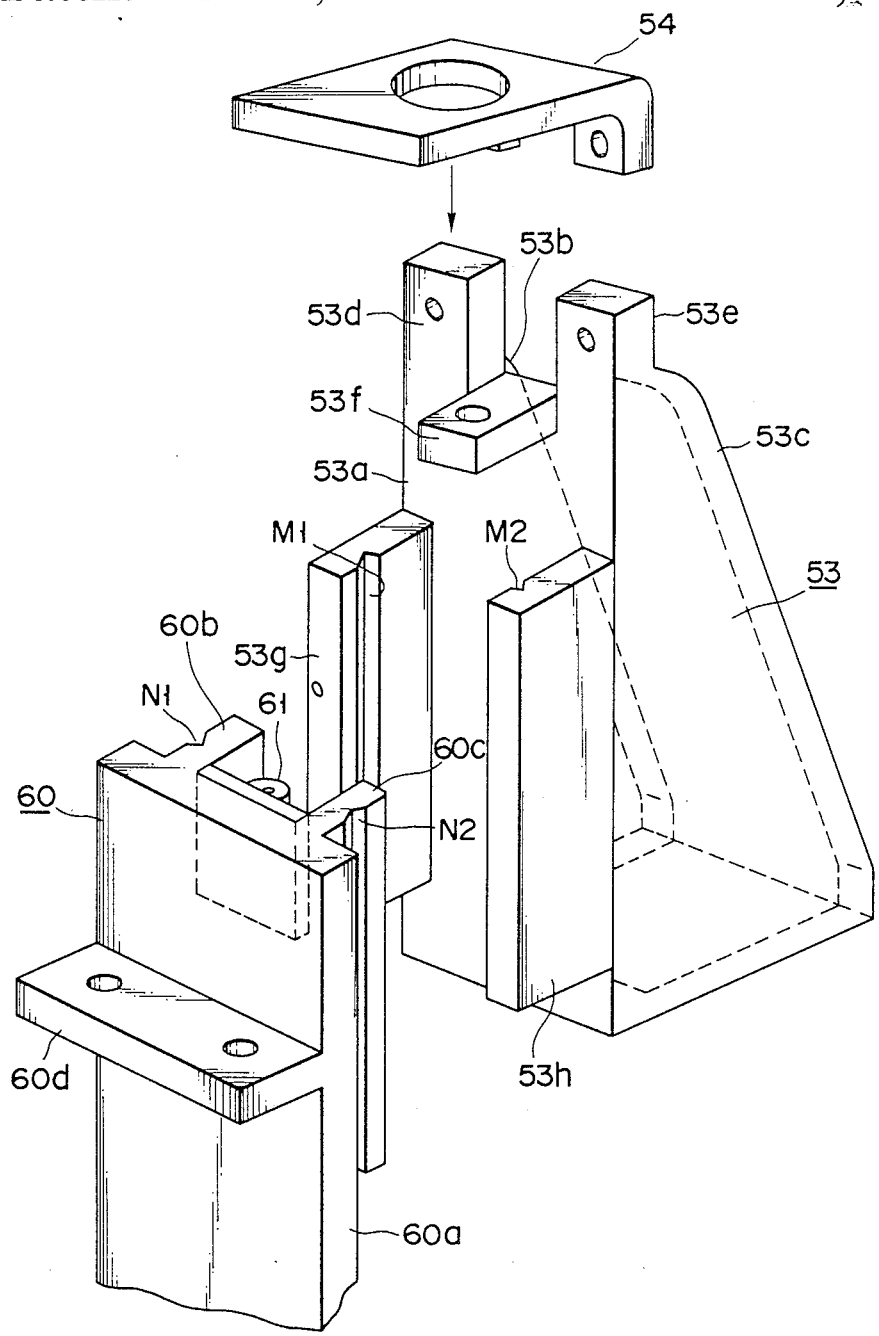
FIG. 6 is an exploded perspective view of a main part of a holder for a microscope as a sample observation optical system.

FIG. 6 is an exploded perspective view of column 53 and a main part of optical system holder 60. As shown in FIG. 6, an arrangement of column 53 is such that triangular supporting side plates 53b and 53c are provided at both sides of L-shaped upright plate 53a, mounting edges 53d and 53e for mounting motor holding plate 54 are provided at the top of plate 53a, and L-shaped holding piece 53f is provided between edges 53d and 53e. A pair of guide plates 53g and 53h are parallelly disposed at both sides on the outer surface of plate 53a. V-grooves M1 and M2 are vertically formed in opposing surfaces, i.e., inner surfaces of plates 53g and 53h, respectively.

A pair of parallel slide plates 60b and 60c stand upright on one surface of vertical plate 60a of holder 60 and vertically, slidably engage with the inner surfaces of plates 53g and 53h mounted on column 53. V-grooves N1 and N2 which oppose grooves M1 and M2 formed in the inner surfaces of plates 53g and 53h are formed in outer surfaces of plates 60b and 60c, respectively. Cross roller linear bearings (not shown) are interposed between opposing grooves, i.e., between grooves M1 and N1 and between grooves M2 and N2. Therefore, a pair of slide plates 60b and 60c can vertically, smoothly slide in a pair of guide plates 53g and 53h, respectively. As a result, holder 60 can vertically slide with respect to column 53. That is, optical system holder 60 serves as a Z stage. It is a matter of course that this sliding operation is performed by feeding nut 61 which threadably engages with the feeding threaded portion of shaft 59. Note that holding piece 60d horizontally projects from the other surface of holder 60.

Referring back to FIGS. 3 and 4, the proximal end portion of optical system mounting plate 62 is coupled to holding piece 60d of optical system holder 60 as shown in FIG. 4. The distal end portion of plate 62 is coupled to a portion near the top of supporting poles 63a and 63b standing upright on supporting plate 33 through linear slide bearing mechanisms 64a and 64b, as shown in FIG. 3. An arrangement of each of mechanisms 64a and 64b is such that a slide bearing is housed in a case fixed on plate 62 by screws and slidably urged against the outer surface of a corresponding one of poles 63a and 63b. Lock screws 65a and 65b are provided at the lower end portions of mechanisms 64a and 64b and fix mechanisms 64a and 64b to poles 63a and 63b, respectively.

Microscope eyepiece 66, TV camera mounting cylinder 67, and observation illuminating light source 68, and the like in observation optical system 18 are fixed on plate 62.

Height measurement optical system 19 is arranged below plate 62. Optical system 19 is fixed to vertical plate 60a of optical system holder 60 through single-shaft movable fine adjustment driver 70. Driver 70 is arranged such that mounting block 76 can be vertically (i.e., in a Z-axis direction) displaced by a driving force of laminated piezoelectric actuator 79 fixed to plate 60a.

Figures 7, 8:
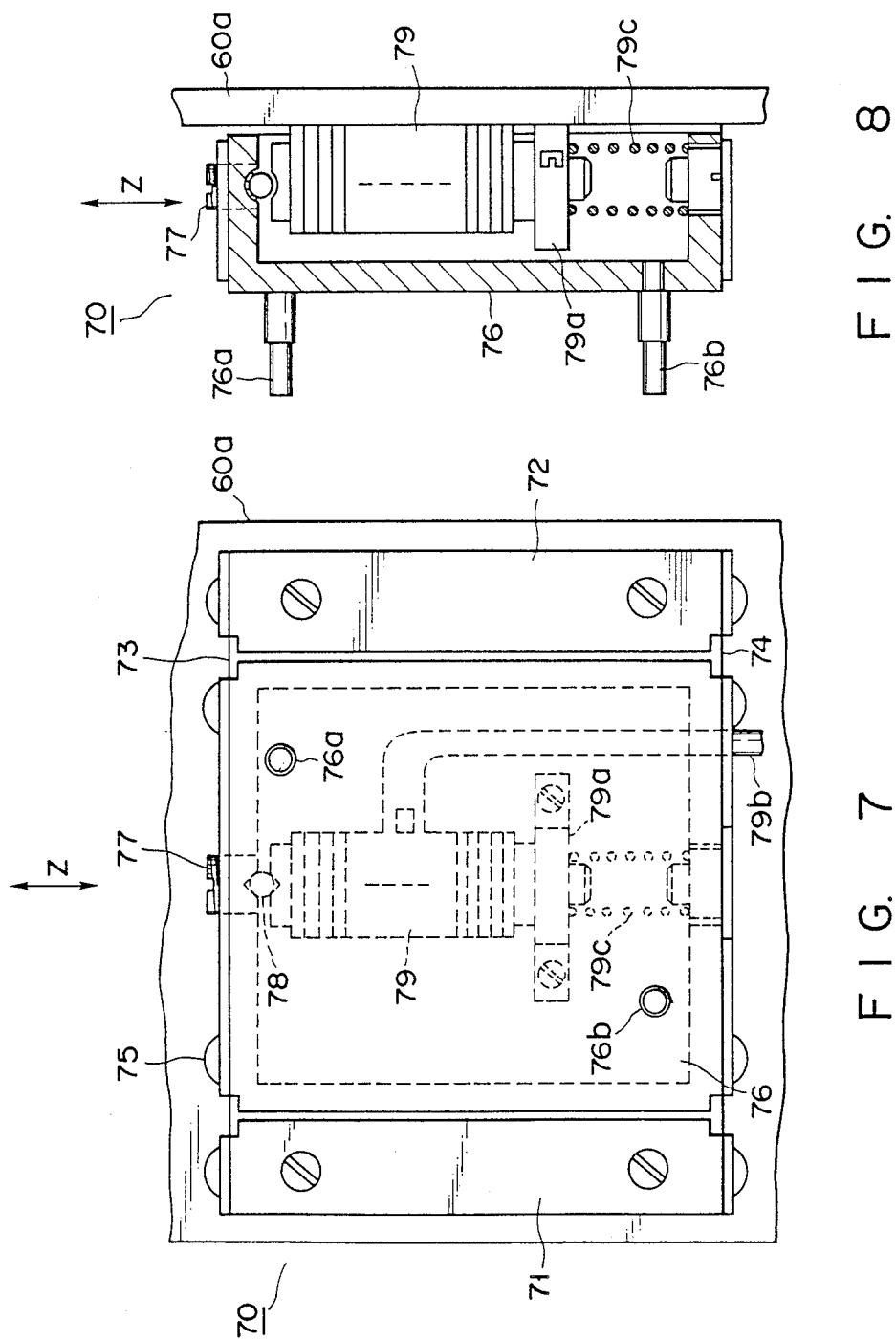
FIG. 7 is a front view of a focus adjusting mechanism of the microscope.
FIG. 8 is a longitudinal sectional view of the focus adjusting mechanism.
Figure 9:
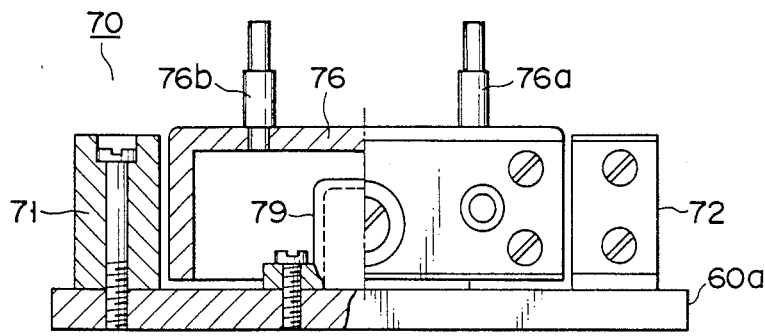
FIG. 9 is a left-half cutaway bottom view of the focus adjusting mechanism.

FIGS. 7 to 9 are front, longitudinal sectional, and left-half cutaway bottom views, respectively, showing single-shaft movable fine adjustment driver 70 in detail. Driver 70 preferably has a structure having a buffering effect utilizing elastic deformation and is arranged as follows. That is, a pair of block posts 71 and 72 are parallelly arranged and fixed by screws at both sides of vertical plate 60a of optical system holder 60. A pair of leaf springs 73 and 74 are fixed at upper and lower ends of posts 71 and 72 by a plurality of machine screws 75. A mounting block 76 is clamped between springs 73 and 74. Two threaded supporting pins 76a and 76b extend from block 76. Adjusting screw 77 is externally mounted at the upper end portion of block 76 through spring 73. The displacement end portion of laminated piezoelectric actuator 79 abuts against an inwardly projecting end portion of block 76 through ball 78. Note that the proximal end of actuator 79 is fixed to vertical plate 60a by fixing element 79a. Reference numeral 79b denotes an electric cord; and 79c, urging force between the displacement end of actuator 79 and screw 77. Thus, fine adjustment in the Z-axis direction is performed to block 76 by a driving force of actuator 79.

Referring back to FIGS. 3 and 4, threaded supporting pins 76a and 76b on mounting block 76 of fine adjustment driver 70 are fitted in mounting holes 80a and 80b, and then lock screws 81a and 81b are threadably engaged with the threaded portions of supporting pins 76a and 76b. As a result, height measurement optical system 19 is detachably mounted on driver 70.

Figure 10:
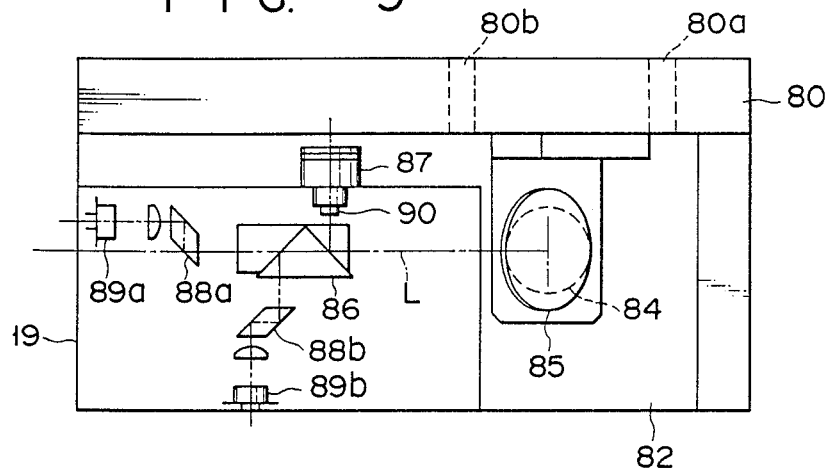
FIG. 10 is a plan view of a displacement measurement optical system.
Figure 11:
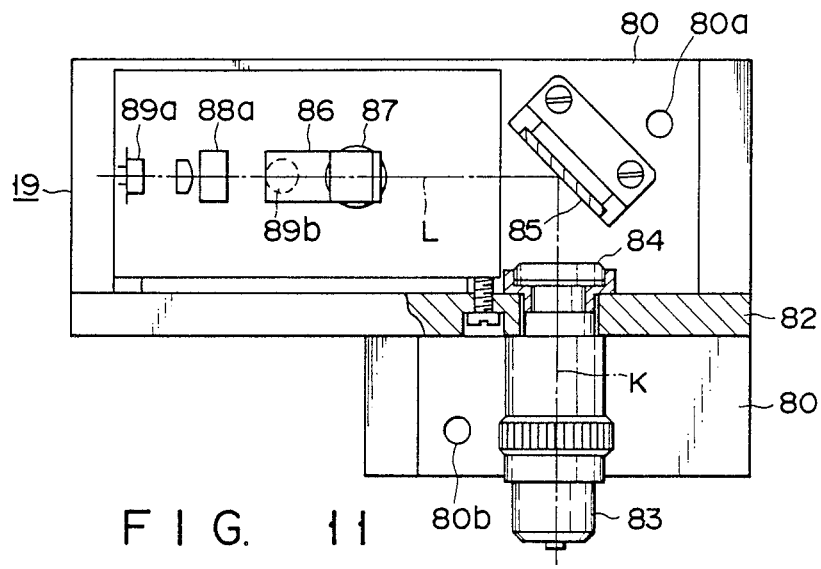
FIG. 11 is a side view of the displacement measurement optical system.

FIGS. 10 and 11 are plan and side views, respectively, showing an arrangement of height measurement optical system 19 as a unit in detail. Objective lens 83 which is commonly used by observation optical system 18 is mounted on supporting plate 82 horizontally standing on mounting base 80. ¼-wave plate 84 and half mirror 85 are arranged at predetermined portions on optical axis K of lens 83. Beam splitter 86 is arranged on optical axis L orthogonal to optical axis K and passing through the center of mirror 85. Measurement light source 87 for emitting a linearly polarized beam as measurement light is arranged to oppose a light incident end of splitter 86. Note that as light source 87, a semiconductor laser consisting of a laser diode or the like is preferably used in an apparatus which must be free from vibration and must have high sensitivity and a small size such as the apparatus according to the present invention. First and second two-split light-receiving elements 89a and 89b are arranged to oppose two light-emitting ends of splitter 86 through a pair of critical angle prisms 88a and 88b. Note that in FIG. 10, reference numeral 90 denotes an optical element such as a cylindrical lens for receiving a linearly polarized beam from light source 87 and shaping the beam. ¼-wave plate 84 may be provided between splitter 86 and mirror 85.

Figure 12:
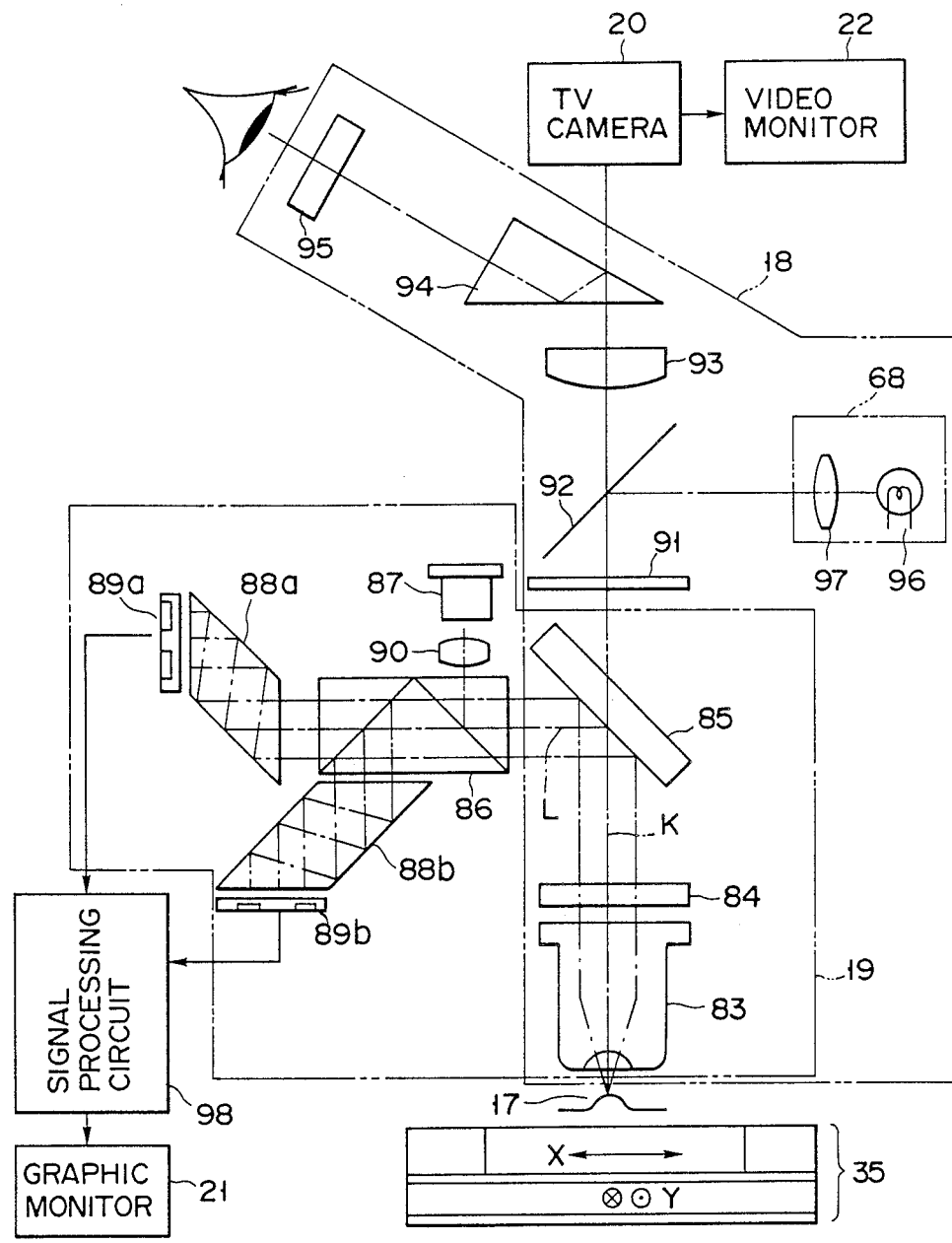
FIG. 12 is a view of the sample observation optical system and the displacement measurement optical system with their peripheral elements.

FIG. 12 shows observation optical system 18 and height measurement optical system 19 together with their peripheral portions, i.e., an entire arrangement of the optical system. In FIG. 12, reference numeral 91 is a filter; 92, a half mirror; 93, imaging lens; 94, a prism; 95, an eyepiece; 96 an illumination lamp; 97, a condenser lens; and 98, a signal processing circuit. Elements other than the above elements have already been described.

A laser beam, i.e., a linearly polarized beam emitted from light source 87 is collimated into parallel light having a circular section by beam shaping element 90, incident on splitter 86, and reflected along optical axis L. The light is reflected by mirror 85 along optical axis K.

Light from observation illuminating light source 68 constituted by lamp 96 and lens 97 is reflected by mirror 92 and transmitted through filter 91 and mirror 85 along the same optical path as that of the laser beam.

Both the laser beam and the illumination light are incident on lens 83 through ¼-wave plate 84. Note that the laser beam is converted from linearly polarized light into circularly polarized light when it passes through plate 84. The laser beam is condensed by lens 83 and projected on sample 17 placed on X-Y stage 35 as a small spot for measuring a fine surface profile. The illumination light illuminates an entire view field through lens 83.

The illumination light reflected from sample 17 is retransmitted through objective lens 83, ¼-wave plate 84, mirror 85, filter 91, and mirror 92, imaged by imaging lens 93, refracted by prism 94, and then reaches a field stop plane of eyepiece 95. The light transmitted through prism 94 is incident on and picked up by TV camera 20 including a CCD imaging element and the like. An imaging signal is supplied to and displayed on video monitor 22. Note that ¼-wave plate 84 is slightly inclined from a direction perpendicular to the optical axis. Therefore, the illumination light from light source 68 is not directly reflected by and incident on the observation optical system, and hence a clear view field observation image is assured without glare.

The laser beam reflected from sample 17 passes through objective lens 83 and ¼-wave plate 84. At this time, the laser beam is converted into linearly polarized light whose vibration plane is rotated through 90° with respect to that upon incidence. The laser beam reflected by mirror 85 is incident on and split by splitter 86. One of the split light components is projected on two-split light-receiving element 89a through critical angle prism 88a, and the other is projected on two-split light-receiving element 89b through critical angle prism 88b. Output signals from elements 89a and 89b are processed by signal processing circuit 98, supplied to graphic monitor 21, and then displayed as a perspective view showing two-dimensional distribution of height information. As described above, since the measurement and observation optical systems commonly use the single objective lens, the optical axes of both the systems do not deviate from each other. In addition, since the measurement optical system is arranged with the objective lens to constitute a single unit, the optical axis need not be adjusted when the objective lens is exchanged. Furthermore, since the single objective lens is commonly used, a measured portion can be observed in an enlarged scale with the microscope and therefore a measured point can be easily determined.

A means for obtaining height information utilizes a focusing error method using a critical angle prism as disclosed in, e.g., Japanese Patent Disclosure (Kokai) Nos. 59-90007 and 60-38606. The means is briefly described below.

When a surface measurement point of sample 17 is located at the focal point of objective lens 83, reflected light transmitted through lens 83 is converted into parallel light. When the surface measurement point of sample 17 is located closer to lens 83 than the focal point of lens 83, the light transmitted through lens 83 is converted into divergent light. When the surface measurement point of sample 17 is located farther from lens 83 than the focal point of lens 83, the light transmitted through lens 83 is converted into convergent light. That is, when the surface measurement point is deviated from the focal point, the light is converted into non-parallel light and incident on critical angle prisms 88a and 88b. The reflecting surface of each of prisms 88a and 88b is set such that it forms a critical angle with respect to the above parallel light. Therefore, when the non-parallel light is incident on prisms 88a and 88b, a central beam of the light is incident at the critical angle. However, a beam deviated in one direction from the center of the light is incident at an angle smaller than the critical angle, and therefore part of the light goes out of the prisms and the remaining light is reflected. A beam deviated in the other direction from the center is incident at an angle larger than the critical angle and therefore is totally reflected. When such an operation is repeated several times in the critical angle prisms, a detection light amount difference between the light incident at the angle smaller than the critical angle and the light incident at the angle larger than that is increased. In this case, a larger or smaller detection amount depends on whether the surface measurement point of sample 17 is located closer to or farther from lens 83 than the focal point of lens 83. Such light beams are received by two-split light-receiving elements 89a and 89b, and a difference in photoelectrically converted signals of the beams is detected. As a result, an output signal having a substantially linear relationship with the height of projections on the surface of sample 17 is obtained. Then, height information at each measurement point is sequentially fetched as data while moving sample 17 in the X and Y directions by X-Y stage 35. The fetched data are processed at high speed by a computer to obtain a three-dimensional image.

An arrangement of a control system of this embodiment will be described below. FIG. 13 is a block diagram of an entire control system.

In FIG. 13, reference numeral 100 denotes a high-performance computer consisting of, e.g., MC-5400 and corresponding to CPU 23 of controller 15 in FIG. 1. Computer 100 includes input I/F (A/D) 101 and output I/F (D/A) 102. Computer 100 is connected to keyboard 14, graphic display 21, volume control 28, and the like in FIG. 1. Computer 100 is also connected to hard disk 103 which corresponds to frame memory 24 in FIG. 1 and plotter 104 and printer 105 in recorder 13. Input devices such as measurement area selecting button 106 and mouse 107 as a control box are connected to input terminals of computer 100, and output devices such as X-axis pulse generator 108, Y-axis pulse generator 109, and Z-axis direction adjuster 110 are connected to its output terminals.

Reference numeral 111 denotes a high voltage amplifier for a piezoelectric actuator. Amplifier 111 amplifies signals from generators 108 and 109 and adjuster 110 and supplies them to piezoelectric actuators 42 and 44 on X-Y stage 35 and Z-axis piezoelectric actuator 79 in height measurement optical system 19.

Height information obtained by system 19 is amplified by laser pickup amplifier 112 and then supplied to computer 100 through input I/F 101. At this time, the information is sampled by a sampling pulse from X-axis pulse generator 108.

A two-dimensional image of the sample surface obtained by observation optical system 18 which is optically coupled to and formed integrally with height measurement optical system 19 is picked up by TV camera 20, and its image signal is supplied to video monitor 22.

A manipulation method and an operation of the entire apparatus of this embodiment, especially operations of above control system, will be described below. First, in order to actuate the apparatus, a power source is turned on, and then (1) data collection (measurement) operation or (2) image processing (display) operation is selected.

The data collection operation will be described first. A flow chart of this operation is shown in FIG. 14.

Sample 17 is placed on sample table 51, and focusing is performed while observing its plane image by observation optical system 18. In order to perform focusing, rotational operation plate 56 provided above column 53 is manually rotated or rotated by motor 55. Then, as optical system holder 60 is moved upward or downward, the entire optical system is vertically moved, and therefore a distance between objective lens 83 and sample 17 is changed. As a result, focusing (coarse adjustment) is performed. After focusing (coarse adjustment) is completed, lock screws 65a and 65b are tightened to fix optical system mounting plate 62. Then, volume control 28 on the operation panel is adjusted. As a result, an output from Z-axis direction adjuster 110 is changed, and therefore Z-axis piezoelectric actuator 79 is actuated. Therefore, very fine focusing (fine adjustment) is performed within the range of a maximum of 20 $\mu$m. That is, since plate 62 is fixed after coarse adjustment, the entire optical system is not displaced with respect to the sample by vibration or the like. In addition, fine adjustment can be performed even in this state, thereby improving accuracy of focus adjustment.

Then, X-axis operation dial 40 and Y-axis operation dial 41 are manually operated to move X and Y slide plates 37 and 39, thereby positioning the origin (initial position) of X-Y stage 35 so that a measurement point is located at the central position of microscope eyepiece 95 and video monitor 22 (a cross index (not shown) indicating a measurement surface central portion or indices A indicating a measurement display range of a stereotyped image displayed on the CPU display is provided in lens 95 and monitor 22), i.e., a measurement image is located at the center of the view field.

Figure 16:
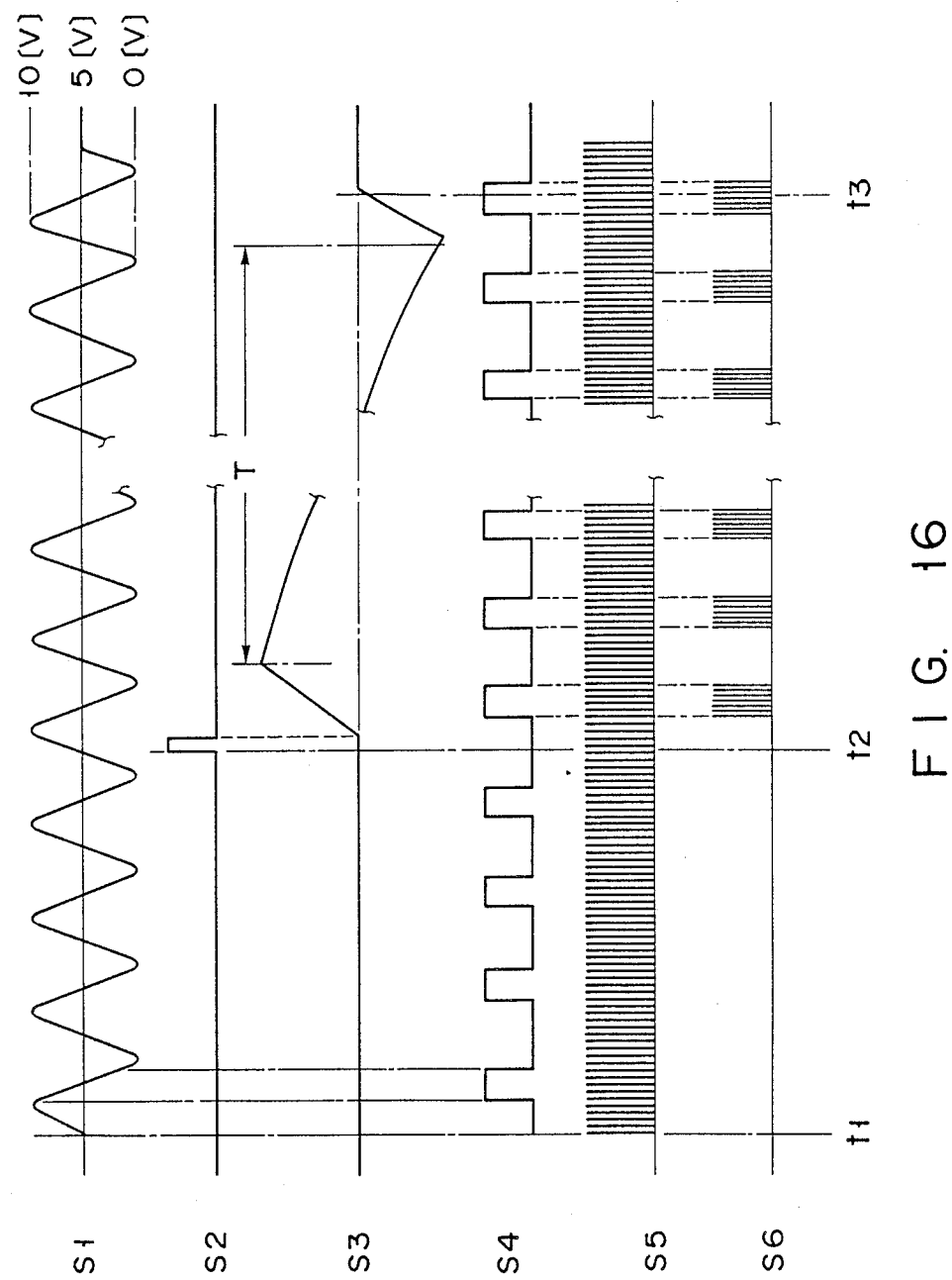
FIG. 16 is a timing chart for explaining driving of the X-Y stage.

Measurement area selecting button 106 is selectively depressed in accordance with an area (range) to be measured of sample 17. Note that as a measurement area, a plurality of measurement areas are set in advance as follows in correspondence to the above indices:

L (Large): 100 $\mu$m $\times$ 100 $\mu$m
R (Reference): 50 $\mu$m $\times$ 50 $\mu$m
M (Medium): 25 $\mu$m $\times$ 25 $\mu$m
S (Small): 10 $\mu$m $\times$ 10 $\mu$m When one of the above four measurement areas, e.g., L (Large) "100 $\mu$m $\times$ 100 $\mu$m" is selected, a waveform generation instruction signal is output from computer 100 in accordance with the selected area. As a result, X-axis pulse generator 108 starts operation in a predetermined operation mode at time t1 of the timing chart shown in FIG. 16, and a triangular wave having a round peak whose maximum amplitude is $\pm 5$ V about $+5$ V as represented by S1 in FIG. 16 is output. This triangular wave output is amplified by high voltage amplifier 111 for the piezoelectric actuator and applied to X-axis piezoelectric actuator 44. Note that the amplitude and the frequency of the triangular wave applied to actuator 44 depend on the type of the measurement area. Examples are as follows:

L: Amplitude: 600 V, Frequency: 3.5 Hz
R: Amplitude: 300 V, Frequency: 5.0 Hz
M: Amplitude: 150 V, Frequency: 10.0 Hz
S: Amplitude: 037 V, Frequency: 15.0 Hz When the triangular wave having any set of the above amplitudes and frequencies is applied to actuator 44, X-Y stage 35 starts free-running in the X direction. Note that since the peak of the triangular wave is round, an acceleration speed upon direction change is reduced. As a result, destruction of actuator 44 is prevented. A state of scanning performed by free-running can be checked because an image on video monitor 22 is vibrated.

A data collection instruction is input by a key operation of keyboard 14. Then, a data collection program is started. A file name of collected data for storage is input at keyboard 14.

When a return key of keyboard 14 is depressed at time t2, a measurement start signal as represented by S2 in FIG. 16 is supplied, and Y-axis pulse generator 109 starts operation. As a result, a saw-toothed wave of only one period is output as represented by S3 in FIG. 16. That is, this wave rapidly moves in one direction from a stop position, returns in the opposite direction to an opposite position at a low speed, and then rapidly returns to the stop position. The saw-toothed wave is amplified by amplifier 111 and applied to Y-axis piezoelectric actuator 42. For this reason, stage 35 starts scanning in the Y direction. Therefore, stage 35 repeatedly moves in the X direction a plurality of times (e.g., 115 times) like a sine wave in linear movement from time t1 to time t2 (period T in FIG. 16) in the Y direction of the saw-toothed wave. As a result, as shown in FIG. 17, a spot radiation point, i.e., measurement point P of the laser beam obtained by height measurement optical system 19 set at the center of the view field of the observation optical system 18 goes to the first scanning line in the Y direction through path 121 as indicated by an arrow from the central position on the designated measurement area of sample 17 and starts X-Y scanning therefrom, thereby executing data collection. When the X-Y scanning cycle of the entire area is completed, measurement point P returns to the center of the observation view field through path 122. When data collection is completed, stage 35 is stopped at a pivoting central position which is a pivoting start position as represented by S1 and S3 in FIG. 16. Therefore, the center of the view field of the observation optical system represents the center of measurement area 120 at the same time.

Analog data obtained by height measurement optical system 19 is amplified by amplifier 112 and then sampled by a sampling pulse from generator 108. As represented by S6 in FIG. 16, this sampling pulse is a pulse train obtained by superposing sample clock S5 of, for example, 3,600 Hz on rectangular wave S4 synchronized with triangular wave S1, output from generator 108, for driving the piezoelectric actuator.

Data including the sampled height information are input to and collected in computer 100 and written in an internal memory of computer 100 and hard disk 103 as raw data. As shown in FIG. 17, the numbers of written raw data are 181 in the X-axis direction and 115 in the Y-axis direction. That is, 20,815 data are totally written. Then, unnecessary data is deleted and necessary data is picked up.

More specifically, data collected through path 121 from the central portion to the upper end of measurement area 120 and those collected through path 122 from the lower end to the central portion are not necessary. In addition, scanning in the X-axis direction is performed by the triangular wave having the rounded peak or the sine wave. Therefore, the data near both ends in the X direction must be deleted because "scanning position deviation" is produced in association with sampling pulses S6 having equal intervals. In this embodiment, 40 data are deleted from each of the ends in the X-axis direction. Furthermore, since scanning in the Y-axis direction is performed by the saw-toothed wave, "pitch deviation" of the scanning line in the scanning direction change portion is produced in the data near both ends in the Y-axis direction. Therefore, these data must be deleted. In this embodiment, data of 7 lines are deleted from each of the ends in the Y-axis direction. Thus, data except for those in measurement area 123 surrounded by a broken line in FIG. 17, i.e., the data (101×101) at the central portion is deleted. After deletion of data is ended, format conversion is performed for display, and the data are stored. Area 123 is displayed by indices A provided in the view field of the view field observing means such as the eyepiece or monitor 22. Therefore, according to this data collecting system, since the view field center of the view field observing means in the observation optical system coincides with the center of the measurement area or the measurement display area, the measurement display area can be easily set or checked.

The image display operation will be described below. FIG. 15 shows the contents of image processing.

An image display instruction is given at keyboard 14. Then, a contour map formed in accordance with the stored data of measurement display area 123 is displayed on graphic display 21. Therefore, a three-dimensional image display mode is selected with mouse 107. Then, processing based on the focusing error method is performed by computer 100 in accordance with the stored data. As a result, a three-dimensional image (perspective view) as shown in FIG. 19 is displayed on display 21. This three-dimensional view shows portion 201 of a wiring line in semiconductor chip 200 as shown in FIG. 18. Note that as shown in FIG. 19, this image is displayed not as a left-to-right inverted image such as an optical microscopic image shown in FIG. 18 but as an image of normal vision corresponding to an actual image. The direction of a plane image as shown in FIG. 18 obtained by observation optical system 18 can be easily coincided with that of the stereotyped image of FIG. 19 obtained by height measurement optical system 19 by providing a mirror means for inverting a left-to-right direction of the plane image or a means for inverting the display direction of the stereotyped image. It is preferred to simultaneously display the plane and stereotyped images whose directions are coincident with each other on the screen of display 21 for easy comparison and examination.

When another image display mode is selected with mouse 107, a shading processed image, a sectional image, or a rotational image of the above three-dimensional image is displayed with arbitrary scale and color if necessary, as shown in FIG. 15.

The height or the end face size of the measurement point can be obtained from the stereotyped or sectional image by placing gratings or the like whose shape and interval are known in correspondence to the X-, Y-, and Z-axes and displaying them with sample 17. SX, SY, and SZ in FIG. 19 represents a scale ($\mu$m) upon size measurement. Note that the above three-dimensional image or the like are plotted out and recorded on recording paper by the plotter in recorder 13.

In order to perform statistic analysis on the basis of size measurement results, frequency analysis, correlation, covariance, variance, roughness on a specific scanning line, and the like are calculated by computer 100, and calculation results are supplied to the video monitor (CRT) or the printer and displayed or recorded.

Note that when the magnification of objective lens 83 used in the optical system is increased, vertical sensitivity is increased to improve resolution. However, a vertical measurable range is narrowed. For this reason, the objective lens must be changed in accordance with the type of a sample.

FIG. 20 is a characteristic view showing a relationship of measurement values with respect to displacement using a NA as a parameter. As shown in FIG. 20, as the NA is increased, a linear change area is narrowed. A relationship between the NA and the magnification is as follows:

Magnification: 50: NA: 0.55
Magnification: 10: NA: 0.25
Magnification: 5: NA: 0.10

Therefore, in order to widen the measurable range although the resolution is more or less reduced, a smaller NA may be used.

In this case, in this embodiment, a portion of height measurement optical system 19 including the objective lens as a unit need only be changed with another (in which the magnification of the objective lens is, e.g., 50, 10, or 5) which is prepared in advance. In order to change optical system 19, lock screws 81a and 81b are untightened to detach optical system 19 from mounting block 76 of fine adjustment driver 70, and another desired height measurement optical system 19 as a unit is mounted on block 76 and fixed by screws 81a and 81b. As described above, optical system 19 is detached/attached by removing/inserting threaded supporting pins 76a and 76b on block 76 with respect to mounting holes 80a and 80b of mounting base 80 of optical system 19. Note that sizes of the laser beam spot with respect to the NAs are as follows:

NA: 0.1 →Spot Size: 9.5 μm
NA: 0.2 →Spot Size: 4.8 μm
NA: 0.3 →Spot Size: 3.2 μm
NA: 0.4 →Spot Size: 2.4 μm
NA: 0.5 →Spot Size: 1.9 μm
NA: 0.6 →Spot Size: 1.6 μm The above embodiment has the following features.

(1) Measuring apparatus 11 shown in FIGS. 3 and 4 structurally has a sufficient vibration-proof function. More particularly, if a height measurement optical system is added to a conventional microscope, column 53 directly stands upright on base 31. With the conventional arrangement, column 53 becomes very tall and the arrangement cannot have a good vibration-proof effect. As a result, measurement on the order of nanometers cannot be performed.

Unlike the conventional arrangement, in the mechanism of the above embodiment, four posts 32a, 32b,... stand upright at four corners of base 31, and supporting plate 33 is mounted on four posts 32a, 32b,... to constitute a box-like space. X-Y stage 35 is mounted inside this space, and column 53 stands upright on supporting plate 33. Therefore, the height of column 53 need not be excessively increased, and the resultant arrangement has a stabilized and vibration-proof structure. Such a vibration-proof structure is very important to perform measurements on the order of nanometers.

Since X-Y stage 35 is housed in the box-like space, it can be protected against an external force and has a stable outer appearance. The X-Y stage 35 is supported by thin parallel springs. Even if an external force acts on the apparatus, its deformation can be prevented.

(2) The second feature of measuring apparatus 11 lies in eyepiece vertical feed mechanism. In the conventional microscope, focusing is performed by using a rack-pinion type mechanism. However, in measuring apparatus 11 of this embodiment, a screw feed mechanism is used as shown in FIG. 4. This mechanism is actuated by manual rotation operation plate 56 or motor 55 to perform coarse adjustment. Therefore, a special lock mechanism and the like which are required in the conventional rack-pinion system can be omitted. During manual operation, operation pin 57 arranged on manual rotation operation plate 56 is rotated to perform manual feeding at high speed. Power feeding and manual feeding can be selectively utilized to result in convenience. At the same time, the required mechanism is simple at low cost.

(3) In measuring apparatus 11 of this embodiment, the distal end portion of optical system mounting plate 62 is coupled to left and right supporting poles 63a and 63b through linear slide bearing mechanisms 64a and 64b, as shown in FIG. 3 and can be locked any time by lock screws 65a and 65b. Therefore, focus (coarse adjustment) can be smoothly performed by a sliding behavior of linear slide bearing mechanisms 64a and 64b. When the distal end portion of mounting plate 62 is locked by lock screws 65a and 65b after focusing (coarse adjustment) is performed, the proximal end portion of mounting plate 62 is supported by column 53 and the distal end portion thereof is supported by supporting poles 63a and 63b. Therefore, both ends of mounting plate 62 are supported and mounting plate 62 has a good vibration-proof structure.

When eyepiece vertical feed motor 55 is driven while optical system mounting plate 62 is kept locked by lock screws 65a and 65b, a load of motor 55 is increased. However, since the rotating shaft of motor 55 is coupled to shaft 59 through frictional plate joint 58, a load having a level exceeding a predetermined level causes a slipping state. Therefore, an accident such as burning of the motor caused by motor overloading can be prevented.

(4) Measurement optical system 19 is not directly connected to mounting plate 62 for mounting observation optical system 18 but is coupled independently of optical system holder 60 through fine adjustment driver 70. Therefore, even if a hand or face is brought into contact with microscope eyepiece 66, its vibration is not directly transmitted to measurement optical system 19. Fine focus adjustment of measurement optical system 19 is performed by piezoelectric actuator 79 upon adjustment of volume control 28 although the operator does not touch the optical system. Therefore, high-precision fine adjustment can be performed.

(5) In X-Y stage 35, laminated piezoelectric actuators 42 and 44 are respectively built into Y and X tables 43 and 45. In addition, an adjusting screw, a ball, and a compression spring are combined to hold the piezoelectric actuators. Therefore, a compact, high-precision stage can be obtained. In addition, Y table 43 having a low vibration frequency is located below X table 45 having a high vibration frequency. Therefore, loads acting on piezoelectric actuators 42 and 44 are well balanced.

(6) Measurement optical system 19 with the objective lens is arranged and replaced as a unit, the optical axis of the objective lens need not be aligned with that of the measurement optical system. Operations for changing a magnification of objective lens 83 can be simplified. A means for exchanging the objective lens can be achieved by a system wherein objective lenses having different magnifications are mounted on a revolver (rotary disc) and one of the objective lens is selected during rotation of the revolver. Exchange of only an objective lens requires high precision in optical axis alignment, and this operation is very difficult from the existing alignment techniques. Therefore, it is very convenient to replace the optical system as a unit having elements whose optical axes are prealigned.

(7) A measurement point of measurement optical system 19 is located at the center of the view field of observation optical system 18, and piezoelectric actuators 44 and 42 of X-Y stage 35 are driven by drive pulses S1 and S3, respectively, as shown in FIG. 16. After a scanning cycle of the entire surface is completed, as shown in FIG. 17, optical system 19 is stopped in the initial position, or the central position of the measurement area or the measurement display range is aligned with the central position of view field observing means in observation optical system 18. Therefore, the measurement display range can be easily specified in observation optical system 18.

(8) Since data of a nonlinear scanning portion subjected to a positional error from the data in the measurement area of measurement optical system 19 is deleted, X-Y scanning time represents the X-Y position. For this reason, a sensor for detecting the measurement position can be omitted, and the measurement position can be easily obtained.

In the first embodiment, height measurement optical system 19 is exemplified by a system using a focusing error detection method using a critical angle prism. However, a focusing error detection method without using a critical angle prism may be employed. For example, as described in Japanese Patent Disclosure (Kokai) No. 58-176505, a feedback signal may be applied to an objective lens drive system to set a focusing error to be always zero so as to vertically move the objective lens. Height information is then obtained from a magnitude of this feedback signal. In this manner, the principle of autofocus optical pickup may be utilized.

According to the first embodiment, a parallel spring vibration type X-Y stage driven by, e.g., piezoelectric actuators is arranged so as to horizontally scan the sample in the X and Y directions. The observation optical system including the view field observing means is arranged to observe a surface profile of the sample on the X-Y stage in an enlarged manner. The height measurement optical system using, e.g., a focusing error detection method is arranged so that the objective lens in the observation optical system also serves as that in the height measurement optical system. Indices representing the measurement display ranges by the height measurement optical system are formed within the view field of the view field observing means, and height information obtained from the height measurement optical system is processed, thereby obtaining a three-dimensional image having a fine surface of the sample. Therefore, a fine surface profile measuring microscope can be provided to accurately and easily detect a correspondence between the range of fine surface of the sample and a three-dimensionally observed image in the height measurement optical system.

Figure 21:
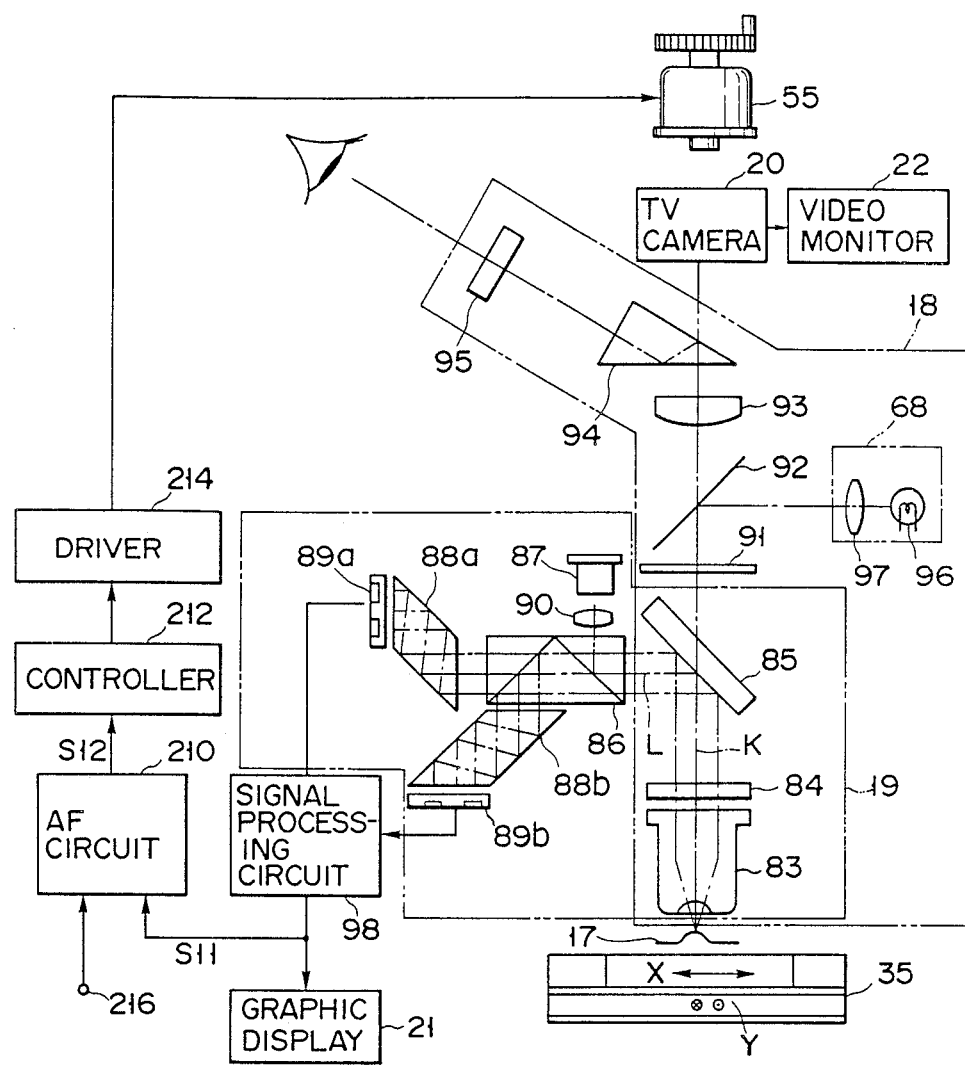
FIG. 21 is a view of an optical system of a fine surface profile measuring apparatus according to the second embodiment of the present invention together with an automatic focusing (autofocus) circuit.

A second embodiment of the present invention will be described below. In the first embodiment, a focus adjustment amount of the objective lens is manually determined. However, in the second embodiment, the focus adjustment amount can be automatically determined. FIG. 21 is a view showing an optical system and its peripheral circuits. The arrangement in FIG. 21 corresponds to that in FIG. 12. The second embodiment is different from the first embodiment in the following points. An output signal from signal processing circuit 98 is fed back to motor 55 through an autofocus control system consisting of AF circuit 210, Z stage control circuit 212, and Z stage driver 214, thereby driving Z stage (optical system holder) 60. As a result, automatic focusing (coarse adjustment) of objective lens 50 is performed.

Figure 22:
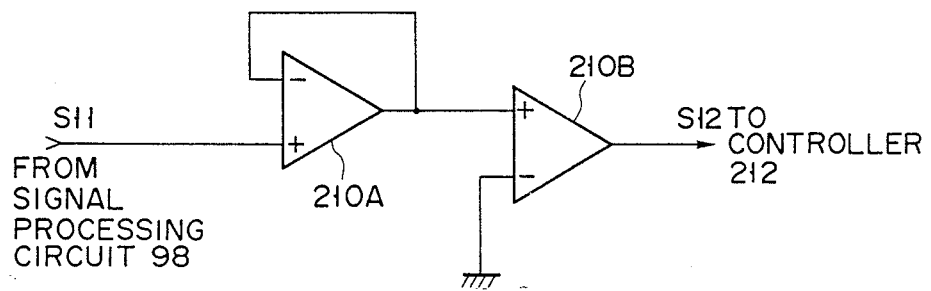
FIG. 22 is a block diagram of the automatic focusing circuit.
Figure 23:
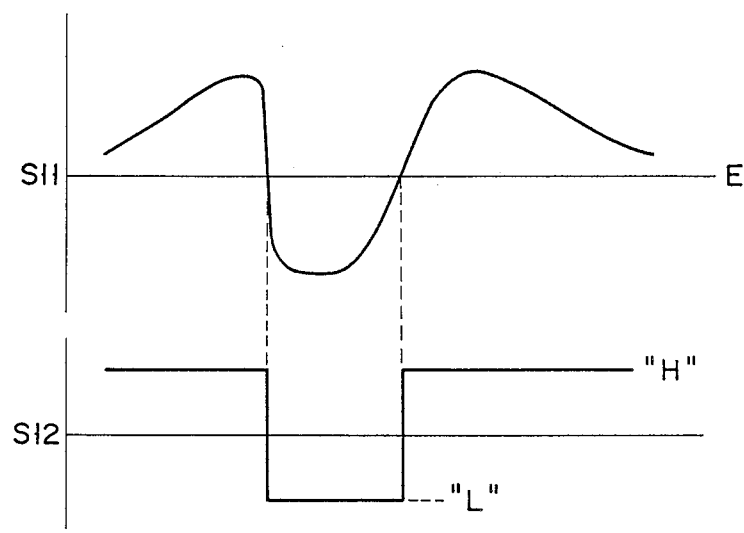
FIG. 23 is a view of signal waveforms of the automatic focusing circuit.

FIG. 22 is a diagram showing an arrangement of AF circuit 210 in the autofocus control system. The circuit shown in FIG. 22 is a comparator circuit as a combination of a buffer 210A of an operational amplifier, and comparator 210B. Height information signal S11 output from signal processing circuit 98 is input to comparator 210B through buffer 210A to extract comparator output signal S12. Therefore, as shown in FIG. 23, when input height information signal S11 exceeds reference level E of comparator 210B, comparator output signal S12 is set to be a high level signal "1". However, when the input height information signal S11 has a level lower than that of reference level E, signal S12 is set to be a low level signal "0".

The operation of the second embodiment having the arrangement described above will be described below.

The operator places sample 17 on sample table 51 and turns on a power switch of the apparatus. An autofocus instruction signal is supplied to terminal 216 to actuate the autofocus control system. Signal S11 supplied through measurement optical system 19 and signal processing circuit 98 is output as comparator output signal S12 from AF circuit 210. Z stage control circuit 212 is operated on the basis of signal S12, and stage driver 214 is operated. As a result, motor 55 is rotated so that a focusing error always becomes zero on the basis of height information signal S11 output from height measurement optical system 19. Z stage 60 is moved and automatic focusing can be performed.

Automatic focusing will be described in detail later. In the above operations, focusing in observation optical system 18 is completed, and at the same time, coarse focusing of height measurement optical system 19 serving as an optical probe is completed.

When the above automatic focusing operations are completed, an observation area of sample 17 is set, and measurement of a fine surface profile is started. More specifically, sample 17 is optically scanned with a probe while X-Y stage 35 is actuated. As a result, a two-dimensional image of the fine surface is displayed on graphic display 21.

Figure 24:
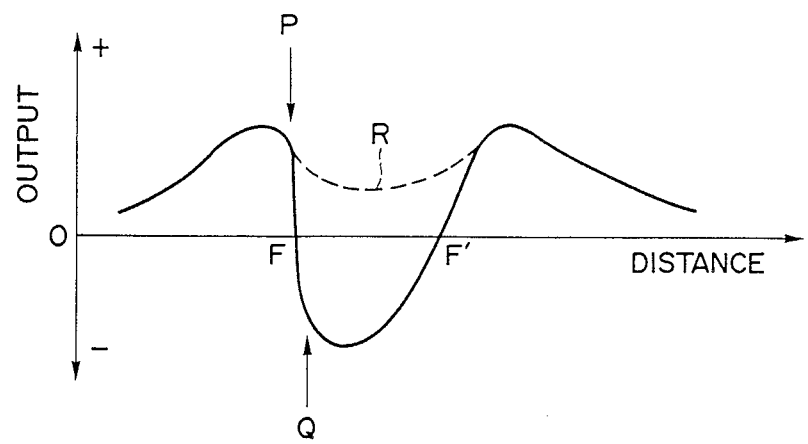
FIG. 24 is a view of signal waveforms indicating height information in a critical angle method.

FIG. 24 is a graph showing an output waveform of the height information signal obtained by optical probing using a critical angle method. The output processed by signal processing circuit 98 on the basis of the signal output from height measurement optical system 19 is plotted along the ordinate in FIG. 24, and the distance between sample 17 and objective lens 83 is plotted along the abscissa. As is apparent from FIG. 24, the output waveform has a complicated shape. In other words, the waveform does not represent a monotonous increase or decrease. Point F represents a focal point and has a value zero when a focusing error is zero. Point F' is called as a pseudo focal point. In general, a portion having excellent linearity between point P near point F and point Q is used to measure roughness of the fine surface, and a portion near point F' is not used.

In general, the position of sample 17 is indeterminate whether sample 17 is in front of or behind the focal point of objective lens 83 prior to measurement. Therefore, in order to automatically focus observation optical system 18, a servo mechanism (disclosed in Japanese Patent Disclosure (Kokai) No. 59-27207) operated near focal point F for measuring surface roughness in a noncontact surface roughness measuring unit cannot be easily applied.

The servo mechanism disclosed in Japanese Patent Disclosure (Kokai) No. 59-27207 is operated within the range of portions having excellent linearity and including the focal point. The range is as very narrow as several microns. When a measurement operation is to be performed, the sample must be adjusted to the range from point P to point Q (including the focal point) having excellent linearity by a separate means. A practical means for performing such adjustment is not described in Patent Disclosure (Kokai) No. 59-27207. Techniques described in U.S. Pat. No. 4,595,829 and Japanese Patent Disclosure (Kokai) No. 60-42725 are associated with monotonously increasing/decreasing waveforms but are not associated with a waveform including the pseudo focal point. The apparatus of the present invention features with a mechanism for setting a sample near a focal point prior to the operation of the AF servo mechanism.

A waveform of the output from the height measurement optical system 19 is not always an ideal waveform indicated by a solid line in FIG. 24. In some cases, the waveform is distorted as indicated by a broken line R in FIG. 24. This phenomenon is caused by an extremely small reflectance of sample 17 and extreme light-scattering. In order to measure such sample 17, a special care must be taken to shift objective lens 83 since no point corresponding to zero output is present.

Figures 25A, 25B:
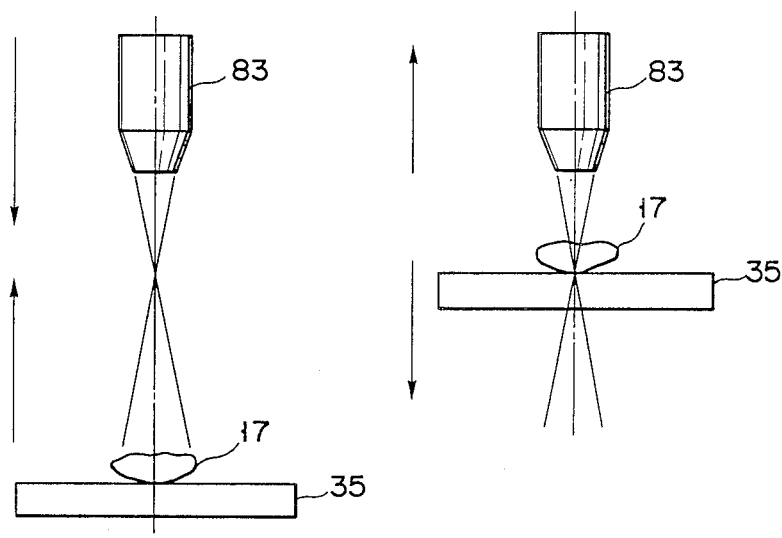
FIGS. 25A and 25B are views for explaining a focusing operation of the objective lens.

As shown in FIG. 25A, for example, assume that focus adjustment is performed using an algorithm for setting sample 17 at a position sufficiently away from objective lens 83, bringing sample 17 close to objective lens 83 by counting the number of zero-crossing points of the waveform by AF circuit 210, and finishing automatic focusing at point F without using point F'. In this case, if sample 17 provides only the output indicated by dotted line R in FIG. 24, an in-focus state is not obtained and the operation continues endlessly. Finally, sample 17 collides against objective lens 83. Height measurement optical system 19 is based on the assumption wherein the system has a high-sensitivity measurement capacity on the order of nanometers. The optical system must be adjusted with high precision. For this reason, collision between sample 17 and objective lens 83 must be avoided.

In order to avoid the above accident, a differentiated waveform of the actual waveform is calculated, and gradient information of the original waveform is controlled on the basis of the differentiated waveform. Since the differentiated waveform must be calculated, a countermeasure against signal waveform distortion caused by vibrations of the apparatus and the like must be taken, thus resulting in high cost of the apparatus.

A control means given in consideration of the above point is shown in FIG. 25B. Automatic focusing is preferably performed such that the objective lens is moved away from a position inside the in-focus position toward a direction for moving the lens away from the sample (i.e., the direction is indicated by an arrow). In the above operation mode, a relatively safe, low-cost autofocus mechanism can be arranged.

When automatic focusing is performed in the direction such that objective lens 83 is away from sample 17, objective lens 83 does not collide against sample 17 although automatic focusing is failed. Therefore, adjustment disturbance of the optical system by a collision can be prevented. High sensitivity on the order of nanometers, which is an indispensable factor of height measurement optical system 19 serving as an optical probe, is not adversely affected.

However, since objective lens 83 is sufficiently away from sample 17 at the initial position, the following operations must be performed in order to perform automatic focusing for moving the objective lens away from the sample, as shown in FIG. 25B. The Z stage is automatically or manually moved in a direction for moving the objective lens close to the sample, the position of the objective lens having passed by the in-focus position is visually checked, the Z stage is then stopped, and automatic focusing must be started. Since accurate focusing is performed by the operation of the autofocus mechanism, accurate positioning need not be performed at this time. For this reason, the operations are not so cumbersome and are sufficiently worth to prevention of a collision between objective lens 83 and sample 17.

If a lens having a large working distance is used as objective lens 83, a possibility of a collision between objective lens 83 and sample 17, which is caused by a visual observation error, can be further reduced.

When only samples 17 having substantially identical characteristics are to be measured, or sample 17 is an unknown sample prior to measurement, a function for moving the objective lens close to the sample and a function of moving the objective lens away from the sample may be selectively used, thereby achieving a lower cost.

Figure 26A:
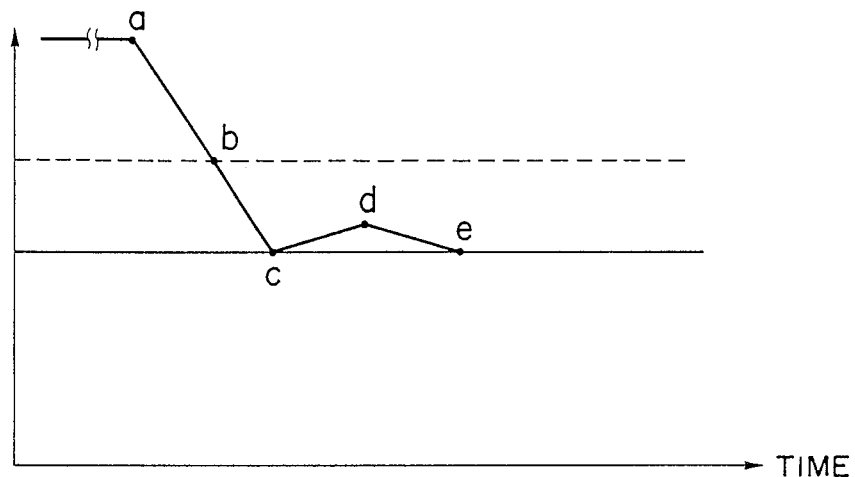
FIGS. 26A and 26B are graphs, corresponding to FIGS. 25A and 25B, for explaining movement of the objective lens.
Figure 26B:
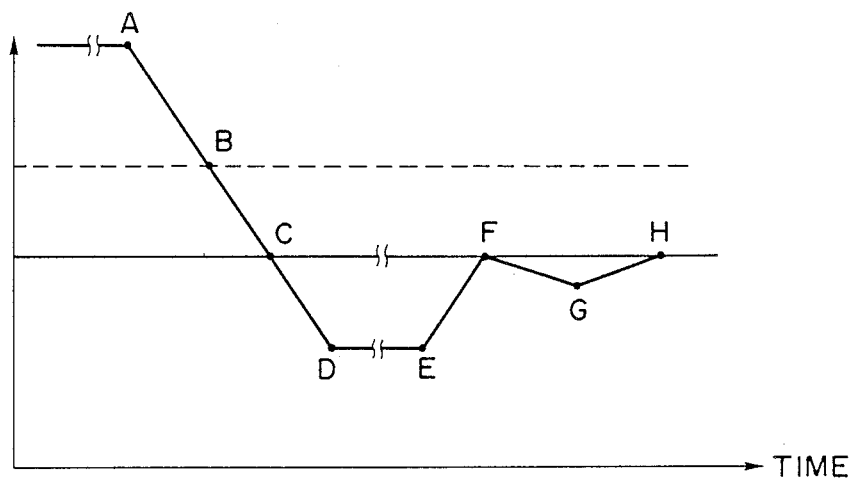

FIGS. 26A and 26B are views showing movement of objective lens 83 when optical system holder 60 serving as the Z stage is moved while X-Y stage 35 is stationary. The distance between the surface of sample 17 and objective lens 83 is plotted along the ordinate, and time is plotted along the abscissa. FIG. 26A shows a case wherein automatic focusing is performed in a direction of an arrow shown in FIG. 25A. Point a is an autofocus start point. The objective lens is moved from point a and reaches in-focus point c through pseudo focal point b. Although an in-focus state is obtained at point c, the focusing error is caused by an inertia force. For this reason, the objective lens is slowly moved to point d and then moved close to point e, thereby automatically obtaining the in-focus state. Therefore, high-precision focusing can be achieved. In order to control the above focusing operations, for example, a comparator circuit is used to perform focusing according to a zero-crossing scheme with respect to a reference voltage of 0 V. In this case, detection must be insensitive for pseudo focal point b. A circuit is enabled to output a stage stop signal during zero-crossing or a stage reversing timing signal when the objective lens has passed by point b. As compared with a servo circuit arrangement, AF circuit 210 can be simplified.

FIG. 26B shows a case wherein automatic focusing is performed in a direction of an arrow in FIG. 25B. The Z stage is manually or automatically moved from point A to point D. The operator visually checks a decrease in distance between objective lens 83 and sample 17 relative to the focal length, thereby completing the operations. Subsequently, automatic focusing is started from point E. Although an in-focus state can be temporarily obtained at point F, the Z stage is slowly returned for correction to point G. The Z stage is moved toward the in-focus position and is stopped at point H, thereby completing automatic focusing. In this case, since the Z stage does not pass by the pseudo focal point B during automatic focusing, AF circuit 210 can be simplified by a degree given by the above operation.

Motor 55 operated on the basis of an output signal from the autofocus control system including AF circuit 210 is preferably a high-precision motor such as a servo or pulse motor with an encoder. A resolution of the entire system including the Z stage must be at least the depth of field of observation optical system 18.

Motor 55 is abruptly rotated or stopped in the drive control of motor 55 according to the zero-crossing scheme using the above comparator circuit, and an excessive load undesirably acts on the motor by an inertia force. When a motor is used which does not allow the above conditions, the speed of the motor is reduced at the start of operation and near the focal point. In this manner, the motor is preferably moderately started or stopped. For example, when a pulse motor is used, voltage/ frequency conversion of the signal output shown in FIG. 24 is performed. Near the focal point, the frequency of the reference pulse into the pulse motor is set to be low. In this case, the minimum frequency is set to fall within the time required for focusing. The lens does not gradually come close to the in-focus position but passes through it, and therefore the time required for focusing can be shortened with a simple circuit arrangement.

When the two stages, i.e., optical system holder 60 serving as a coarse adjustment stage driven by motor 55 and fine adjustment driver 70 serving as a fine adjustment stage driven by piezoelectric actuator 79 are provided, high-sensitivity measurement can be desirably performed. For example, the coarse adjustment stage is moved by the means shown in FIGS. 26A and 26B, and then the fine adjustment stage is operated by a proper means (e.g., zero-crossing scheme), thereby performing focusing with higher precision.

Fluctuations of the Z stage by an inertia force such as a motor adversely affect the high-sensitivity optical probe, i.e., the output from height measurement optical system 19. The fluctuations may cause chattering when a comparator is used in AF circuit 210. An output from height measurement optical system 19 is positively fed back, and a Schmitt trigger circuit is arranged to adjust a dead-zone voltage amplitude. In addition, the first leading or trailing edge of the output from the comparator circuit near the focal point position is detected, and a sequence is formatted on the basis of the detection result, thereby eliminating the influence of the fluctuations.

The second embodiment exemplifies height measurement optical system 60 using the critical angle method. However, the present invention is also applicable to an apparatus including a height measurement optical system using an astigmatism method.

According to the second embodiment, the vertical stage is moved using high-precision height information obtained by a height measuring optical system, and then automatic focusing of the objective lens is performed. Therefore, focusing in the observation optical system can be easily and accurately performed, and operability can be improved. Measurement of the fine surface profile of the sample and automatic focusing of the observation optical system can be performed on the basis of height information. Therefore, the arrangement can be simplified at low cost. There is provided a low-cost fine surface profile measurement microscope which comprises a measuring optical system and the observation optical system, both of which commonly use one objective lens. This microscope allows easy focusing and has good operability.

What is claimed is:

1. A fine surface profile measuring apparatus comprising:
   table means for supporting a sample thereon;
   a measurement optical system for emitting a measurement light onto the sample placed on said table means, and for receiving the measurement light reflected by the sample;
   drive means for moving said table means in two dimensions;
   operating means for calculating height information of the sample on the basis of a signal output from said measurement optical system, and for obtaining a two-dimensional distribution of the height information of the sample;
   cover means for covering at least said table means and measurement optical system;
   an observation light source, arranged outside said cover means, for generating an observation light; and
   an observation optical system, arranged inside said cover means, for illuminating the sample on said table means with the observation light, and for forming an enlarged optical image of the sample, said observation optical system having optical axis alignment means for aligning an optical axis of said observation optical system with that of said measurement optical system, and said observation optical system being provided with an objective lens also serving as that of said measurement optical system.

2. A micro-displacement measuring apparatus comprising:
   table means, mounted on a base, for supporting a sample thereon and two-dimensionally moving the sample;
   a measurement optical system for emitting a measurement light onto the sample on said table means and for receiving the measurement light reflected by the sample;
   an observation optical system for forming an optical image of the sample in an enlarged manner;
   a supporting plate having an opening at a position corresponding to said table means;
   a supporting member, standing on said base, for supporting said supporting plate in the vicinity of, and in parallel to, a table surface of said table means; and
   arm means, mounted on said supporting plate, for supporting said measurement optical system and said observation optical system.

3. A micro-displacement measuring apparatus comprising:
   table means for supporting a sample thereon;
   an objective lens disposed above said table means;
   a measurement optical system for emitting a measurement light onto the sample on said table means through said objective lens and for receiving the measurement light reflected by the sample;
   an observation optical system for forming an optical image of the sample through said objective lens in an enlarged manner;
   coarse focus adjusting means for moving said measurement optical system, said observation optical system, and said objective lens together in a height direction;
   means for locking said coarse focus adjusting means to fix a distance between said observation optical system and the sample;
   fine focus adjusting means for moving said objective lens and said measurement optical system together in the height direction; and signal processing means for calculating height information of the sample on the basis of a signal output from said measurement optical system.

4. An apparatus according to claim 3, in which said locking means comprises:
- a mounting plate provided at said observation optical system;
- a base for supporting said table means;
- a pole standing on said base;
- means for supporting said mounting plate in a slidable manner with respect to said pole; and
- means for locking the mounting plate with respect to said pole.

5. A fine surface profile measuring apparatus comprising:
- table means for supporting a sample thereon;
- a measurement optical system for emitting a measurement light onto the sample on said table means and for receiving the measurement light reflected by the sample;
- means for generating a saw-toothed wave signal of which all peaks are rounded;
- actuator means for two-dimensionally vibrating said table means in accordance with an amplitude of the sawtoothed wave and scanning with the measurement light a range larger than a measurement range of the sample; and
- signal processing means for calculating height information of the sample on the basis of a signal associated with the measurement range of the sample and selected from outputs from said measurement optical system and for obtaining a two-dimensional distribution of the height information of the sample.

6. An apparatus according to claim 5, in which said actuator means comprises a leaf spring for supporting said table means and a piezoelectric actuator for vibrating said table means against a supporting force of said leaf spring.

7. A micro-displacement measuring apparatus comprising:
- table means for supporting a sample thereon;
- an objective lens disposed above said table means;
- a measurement optical system for emitting a measurement light onto the sample on said table means through said objective lens and for receiving the measurement light reflected by the sample;
- an observation optical system for forming an optical image of the sample through said objective lens in an enlarged manner;
- optical axis alignment means for aligning an optical path of said measurement optical system with that of said observation optical system and for transmitting a beam through said objective lens, said optical axis alignment means being integrally formed as a detachable unit with said measurement optical system and said objective lens; and
- signal processing means, connected to said measurement optical system, for measuring height information of the sample on the basis of the measurement light reflected by the sample and transmitted through said objective lens.

8. An apparatus according to claim 7, further comprising means for two-dimensionally scanning said table means in a plane perpendicular to the measurement light and for causing the measurement light to two-dimensionally scan a measurement area of the sample on said table means.

9. An apparatus according to claim 7, in which a center of a view field of said observation optical system is aligned with a center of the measurement area.

10. A micro-displacement measuring apparatus comprising:
- table means for supporting a sample thereon;
- an objective lens disposed above said table means;
- a measurement optical system for emitting a measurement light onto the sample on said table means through said objective lens and for receiving the measurement light reflected by the sample;
- an observation optical system for forming an optical image of the sample in an enlarged manner;
- optical axis alignment means for aligning an optical path of said observation optical system with that of said measurement optical system and for transmitting the measurement light through said objective lens;
- signal processing means, connected to said measurement optical system, for measuring height information of the sample on the basis of the measurement light reflected by the sample and transmitted through said objective lens; and
- means for placing said table means at an initial position at which the measurement light irradiates the center of a measurement area of the sample;
- scanning means for two-dimensionally scanning said table means in a plane perpendicular to the measurement light and for causing the measurement light to two-dimensionally scan the measurement area from one end to the opposite end of the measurement area, wherein said scanning means includes means for first moving said table means from the initial position to a position at which the measurement light irradiates the one end, and after the two-dimensional scanning of the measurement area is ended for then moving said table means back to the initial position.

11. A micro-displacement measuring apparatus comprising:
- table means for supporting a sample thereon;
- an objective lens disposed above said table means;
- an observation optical system for forming an optical image of the sample through said objective lens in an enlarged manner;
- a measurement optical system using a focus error method for emitting a measurement light onto the sample on said table means through said objective lens and for receiving the measurement light reflected by the sample;
- signal processing means for calculating height information of the sample using an output from said measurement optical system; and
- focus adjusting means for moving said objective lens in a height direction in response to an output from said operating means and for adjusting a focal point of said measurement optical system, said focus adjusting means including means for moving said objective lens to an in-focus point at a first speed, moving said objective lens away from the in-focus point at a speed lower than the first speed, and moving said objective lens close to the in-focus position at a speed lower than the first speed.

12. An apparatus according to claim 11, in which said focus adjusting means integrally moves said objective lens with said observation optical system and said measurement optical system.

* * * * *